United States Patent Office 3,836,541
Patented Sept. 17, 1974

3,836,541
3-CYANO-2-PYRRYL OXAMIC ACIDS
Herbert G. Johnson, John B. Wright, Charles M. Hall, and Donald T. Warner, Kalamazoo, Mich., assignors to The Upjohn Company, Kalamazoo, Mich.
No Drawing. Filed Sept. 27, 1972, Ser. No. 292,651
Int. Cl. C07d 27/26
U.S. Cl. 260—326.2                                     5 Claims

ABSTRACT OF THE DISCLOSURE

This invention relates to novel compounds and pharmaceutical compositions containing said compounds of the formula:

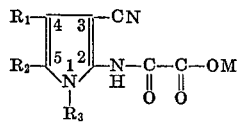

Ia wherein M is selected from the group consisting of hydrogen, aluminum, ammonium, sodium, potassium, calcium, and tris-(hydroxymethyl)methylammonium, $R_1$ is selected from the group consisting of lower alkyl of 1 through 6 carbon atoms,

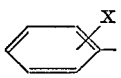

wherein X is selected from the group consisting of hydrogen, fluorine, chlorine, bromine, methoxy, methyl and trifluoromethyl, $R_2$ is selected from the group consisting of hydrogen and lower alkyl of 1 through 6 carbon atoms, and $R_3$ has the same meaning as $R_1$ and in addition hydrogen.

The compounds (1a) above are formulated with pharmaceutical carriers for inhalation or for oral, parenteral or rectal administration, with insufflation being the preferred method. The compositions are useful in the prophylactic treatment of sensitized humans and mammals for allergic and all anaphylactic reactions of a reagin-mediated and non-reagin-mediated nature.

CROSS REFERENCE TO RELATED APPLICATIONS

None.

BRIEF SUMMARY OF THE INVENTION

This invention relates to novel compounds and pharmaceutical compositions of said compounds and a process for the prophylactic treatment of allergic conditions employing said compositions.

The novel compositions comprise a novel compound of the formula

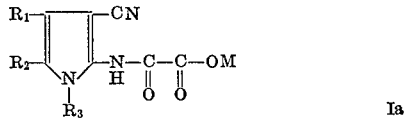

Ia wherein M is selected from the group consisting of hydrogen, aluminum, ammonium, sodium, potassium, calcium and tris-(hydroxymethyl)methylammonium, $R_1$ is selected from the group consisting of lower alkyl of 1 through 6 carbon atoms,

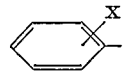

wherein X is selected from the group consisting of hydrogen, fluorine, chlorine, bromine, methoxy, methyl and trifluoromethyl, $R_2$ is selected from the group consisting of hydrogen and lower alkyl of 1 through 6 carbon atoms, and $R_3$ has the same meaning as $R_1$ and in addition, hydrogen, in association with a pharmaceutical carrier.

As employed in this application, the term "lower alky" includes methyl, ethyl, propyl, isopropyl, butyl, isobutyl, tert, butyl, pentyl, isopentyl, neopentyl, hexyl, isohexyl and 3,3-dimethylbutyl.

The novel compounds (1a) of this invention wherein $R_3$ is hydrogen, and a process for their preparation are represented by the following sequence of formulae:

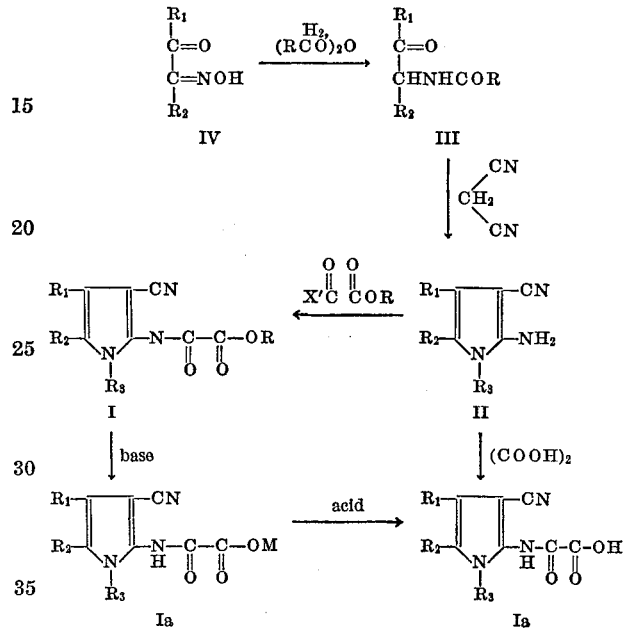

wherein R is lower alkyl of 1 through 6 carbon atoms, $R_1$, $R_2$, and M have the same meaning as above, $R_3$ is hydrogen and X' is selected from the group consisting of fluorine, chlorine, and bromine.

The compounds of Formula I are prepared by the acylation of the corresponding 2-amino compounds of Formula II. The thus produced acylates (I) are converted to their corresponding metal salts (Ia) by mixing with a base; said salts yield corresponding hydroxy compounds (Ia) on acidification with an aqueous solution of a strong mineral acid. Alternatively, the hydroxy compounds (Ia) can be prepared by heating the corresponding 2-amino compounds (II) with oxalic acid. A number of compounds of Formula II are known in the art, e.g., those prepared in the manner described by Gewald in Z. Chem. 1, 349; numerous others (II) can be prepared by the condensation of a corresponding aminoketone of Formula III (many of which are known in the art) by reaction with malononitrile, followed by $N^1$-deacylation. The compounds of Formula III are prepared by the concomitant reduction and acylation of a known 3-oxime of Formula IV.

The compounds embraced by Formula Ia of the flowsheet, above, when employing the compounds of Formula IV thereof as starting materials, are prepared by the procedures indicated therein, using the methods and reactions described below.

(1) The first step (IV→III) of the aforesaid flowsheet comprises the concomitant reduction and acylation of a 3-oxime (IV), e.g., by its reaction with hydrogen (in the presence of a catalyst such as palladium on charcoal) and an anhydride of a hydrocarbon carboxylic acid (such as acetic anhydride, propionic anhydride, butyric anhydride and the like) in an acid medium (e.g., acetic acid, propionic acid, butyric acid etc.), to yield a corresponding amino ketone (III), i.e., an N-(1-alkylhydrocarbonyl)acylamide (III).

(2) The next step (III→II) involves the condensation of an amino ketone (III) produced in step (1) with malononitrile followed by $N_1$-deacylation to give a corresponding 2-amino-3-cyano-4-substituted (or 4,5-disubstituted) pyrrole (II). The pyrrole (II) can be prepared, for example, by (a) refluxing approximately equimolar amounts of an amino ketone (III) and malononitrile in ethanol or water with 1 equivalent of sodium hydroxide or triethylamine and the corresponding pyrrole (II) crystallized by the addition of water or extraction with ether; or (b) mixing approximately equimolar amounts of III and the nitrile in the cold and adding 50% aqueous potassium hydroxide solution until a pH of 12 to 13 is reached and a precipitate forms, which on warming dissolves and following cooling and dilution with ice water gives the corresponding pyrrole (II).

Alternatively, compounds of Formula II can be prepared by treatment of amino ketones of the Formula V, prepared by reduction of compounds of Formula IV in the absence of acyl anhydrides, in the usual manner with malononitrile.

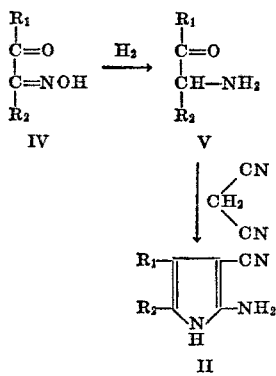

(3) The third step (II→I) of the process comprises the acylation of 2-amino-3-cyano-4-substituted (or 4,5-disubstituted)pyrrole (II) obtained in step (2), e.g., by slowly adding to a cold (0° C.) solution of a pyrrole (II) in a solvent such as ethyl acetate along with a base such as triethylamine, an alkyl oxalyl halide (e.g., methyl oxalyl chloride, ethyl oxalyl chloride, butyl oxalyl fluoride, pentyl oxalyl bromide, etc.) [employing approximately equimolar amounts of pyrrole (II) and alkyl oxalyl halide], to yield a corresponding alkyl [3-cyano - 4 - substituted (or 4,5-disubstituted)-2-pyrryl]oxamate (I).

(4) The fourth step (I→Ia) comprises mixing an oxamate (I) produced in step (3) with an aqueous solution of a base (e.g., ammonium hydroxide, sodium hydroxide, potassium or calcium hydroxide) at moderate (room) temperature, to give a corresponding [3 - cyano-4-substituted (or 4,5-disubstituted)-2-pyrryl]oxamic acid, metal salt (Ia).

(5) As a final step (I→Ia) a metal salt of an oxamic acid (Ia) produced in step (4), on acidification (e.g., with a strong acid such as 1N aqueous hydrochloric acid, sulfuric acid or nitric acid) precipitates a corresponding [3-cyano-4-substituted (or 4,5 - disubstituted) - 2 - pyrryl] oxamic acid (Ia).

Instead of employing the procedure of step (5), a 2-amino-3-cyano-4-substituted (or 4,5 - disubstituted)pyrrole (II) on addition thereto of an excess of oxalic acid (e.g., about 1 mole (II): 5 moles oxalic acid), followed by heating (e.g., at about 200° C. for about 2 hours), then cooling and diluting the mixture with ice-water, gives a corresponding [3-cyano-4-substituted (or 4,5 - disubstituted)-2-pyrryl]oxamic acid (Ia).

The novel compounds (Ia) of this invention wherein $R_3$ is other than hydrogen, and a process for their preparation are represented by the following sequence of formulae:

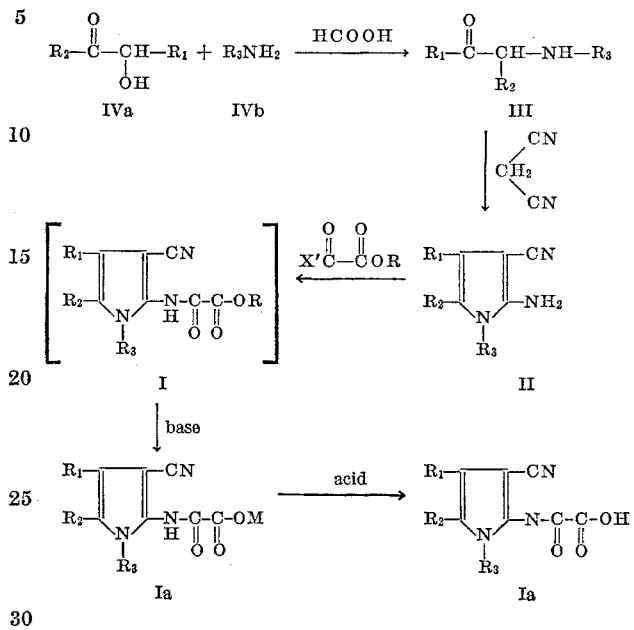

wherein $R_1$, $R_2$, M and X' have the same meaning as is previously set forth following the first sequence of formulae, whereas in the sequence immediately above, $R_3$ is selected from the group consisting of lower alkyl of 1 through 6 carbon atoms and

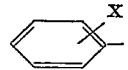

wherein X is selected from the group consisting of hydrogen, fluorine, chlorine, methoxy, methyl and trifluoromethyl.

$N^1$-substituted compounds embraced by Formula Ia of the flow-sheet, immediately above, when employing the compounds of Formulae IVa plus IVb as starting materials, are prepared by the procedures indicated therein, using the methods and reactions described below.

(1) The first step (IVa+IVb→III) of the aforesaid flow-sheet comprises heating a mixture of a 3-hydroxy-2-alkanone (IVa) and a substituted or unsubstituted phenyl (or alkyl) amine (IVb) with formic acid to yield a corresponding ω-substituted or unsubstituted phenyl (or alkyl)-2-alkanone (III).

(2), (3), (4) and (5). Although the first step of this process is different from the one for preparing the $N^1$-unsubstituted compounds of Formula Ia, the remaining steps, (2) through (5), are the same. Thus, subjecting a ω-substituted or unsubstituted phenyl (or alkyl) - 2 - alkanone (III) produced in step (1) to these common procedures, yields a corresponding [3-cyano-4-substituted (or 4,5-disubstituted)-1-substituted or unsubstituted phenyl (or alkyl) pyrrol-2-yl]oxamic acid (Ia) or a metal salt (Ia) thereof.

All of the compounds included within Formula Ia and the intermediates I, II and III therefor of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

The novel compounds (I) of this invention have anti-allergenic (especially anti-asthmatic) activity, inhibiting a positive Passive Cutaneous Anaphylactic (PCA) test induced by the rat immunochemical counterpart of human lgE (reagin), considered indicative of allergic activity. This activity is apparent when these compounds are tested for their inhibition of the rat's PCA reaction. The PCA assay is described by I. Mota in Ann. N.Y. Acad. Sci. *103*, 264 (1963).

DETAILED DESCRIPTION

The following preparations and examples are illustrative of the manner of making and using the invention and set forth the best mode contemplated by the inventor of carrying out his invention, but are not to be construed as limiting the scope thereof.

Preparation 1.—2-amino-3-cyano-4,5-dimethylpyrrole (II)

In a 500 ml. pressure bottle there is placed 10.11 g. (0.1 mole) of 2,3-butanedione 3-monoxime (IV), prepared as in Org. Synthesis, Coll. Vol. 11, 204 (1943), 1.5 g. of 5% palladium on carbon, 80 ml. of acetic acid and 20 ml. of acetic anhydride. The bottle is put on a shaker hydrogenating apparatus and hydrogen at 60 pounds per square inch admitted. After about 40 minutes, the reaction is complete and the catalyst is removed by filtration. Three such reductions are carried out and the filtrates combined and concentrated under vacuum. The thus produced residual oil, N-(1-methylacetonyl)acetamide (III), is washed into a flask with about 100 ml. of methanol and the flask placed in an ice-bath. To the chilled mixture 26.4 g. (0.4 mole) of malononitrile (or dicyanomethane) is added with stirring. To the stirring mixture, 50% aqueous potassium hydroxide solution is added dropwise until a pH of 12 to 13 is reached. Shortly after this pH is obtained, a precipitate appears. The mixture containing the precipitate is stirred for about 15 minutes more at the cold temperature, and then placed in a water bath at about 45 to 50° C. for about 45 minutes. The precipitate dissolves to yield a red solution. This solution is cooled and diluted with about 400 to 500 ml. of ice water to give a precipitate which is collected and washed with cold water until the filtrate is free of color. The precipitated crude pyrrole (II) amounting to about 20 g. (about 50% of the theoretical yield) is recrystallized from aqueous methanol to yield 2-amino-3-cyano-4,5-dimethylpyrrole (II) melting at 165 to 168° C.

Preparation 2.—2-amino-3-cyano-4,5-diethylpyrrole (II)

Following the procedure of Preparation 1 but substituting 3,4-hexanedione 4-oxime (IV) (prepared as in U.S. Patent 2,393,532) as starting material, yields 2-amino-3-cyano-4,5-diethylpyrrole (II).

Preparation 3.—2-amino-3-cyano-4,5-dipropylpyrrole (II)

Following the procedure of Preparation 1 but substituting 4,5-octanedione 5-oxime (IV) (prepared as in Bull. Soc. Chim. *41*, 1370) as starting material, yields 2-amino-3-cyano-4,5-dipropylpyrrole (II).

Preparation 4.—2-amino-3-cyano-4,5-diisopropylpyrrole (II)

Following the procedure of Preparation 1 but substituting 2,5-dimethyl-3,4-hexanedione 4-oxime (IV) (prepared as in Ber. *16*, 2991) as starting material, yields 2-amino-3-cyano-4,5-diisopropylpyrrole (II).

Preparation 5.—2-amino-3-cyano-4,5-dibutylpyrrole (II)

Following the procedure of Preparation 1 but substituting 5,6-decanedione 6-oxime (IV) (prepared as in J. Org. Chem. *24*, 1726) as starting material, yields 2-amino-3-cyano-4,5-dibutylpyrrole (II).

Preparation 6.—2-amino-3-cyano-4,5-dipentylpyrrole (II)

Following the procedure of Preparation 1 but substituting 6,7-dodecanedione 7-oxime (IV) (prepared as in Gazz. Chim. ital. *31*, i, 406) as starting material, yields 2-amino-3-cyano-4,5-dipentylpyrrole (II).

Preparation 7.—2-amino-3-cyano-4,5-dihexylpyrrole (II)

Following the procedure of Preparation 1 but substituting 7,8-tetradodecanedione 8-oxime as starting material, yields 2-amino-3-cyano-4,5-hexylpyrrole (II).

Preparation 8.—2-amino-3-cyano-4-phenylpyrrole (II)

To a solution of 16.6 g. (0.097 mole) of 2-aminoacetophenone hydrochloride (V) (prepared as in J. Amer. Chem. Soc. *82*, 459) in 50 ml. of absolute ethanol, 7.65 g. (0.116 mole) of malononitrile and 9.85 g. (0.097 mole) of triethylamine is added. The mixture is stirred for about 1 hour at room temperature and then poured into about 1 l. of water. The resulting precipitate is removed by filtration, recrystallized from aqueous ethanol and the solid that forms triturated with benzene to give 7.4 g. of 2-amino-3-cyano-4-phenylpyrrole (II) melting at 170 to 172° C. An additional 2.6 g. of product (II) melting at 172 to 174° C. is obtained from the mother liquors.

Preparation 9.—2-amino-3-cyano-4-(p-bromo)-phenylpyrrole (II)

Following the procedure of Preparation 8 but substituting 2-amino-4'-bromoacetophenone hydrochloride (V) (prepared as in Compt. rend. *230*, 622) as starting material, yields 2-amino-3-cyano 4-(p-bromo)phenylpyrrole (II).

Preparation 10.—2-amino-3-cyano-4-(p-chloro)-phenylpyrrole (II)

Following the procedure of Preparation 8 but substituting 2-amino-4'-chloroacetophenone hydrochloride (V) (prepared as in Compt. rend. *230*, 622) as starting material, yields 2 - amino - 3 - cyano-(p-chloro)phenylpyrrole (II).

Preparation 11.—2-amino-3-cyano-4-(p-fluoro)-phenylpyrrole (II)

Following the procedure of Preparation 8 but substituting 2-amino-4'-fluoroacetophenone hydrochloride (V) (prepared as in J. Chem. Soc. 1950, 2776) as starting material, yields 2 - amino - 3 - cyano-4-(p-fluoro)phenylpyrrole (II).

Preparation 12.—2-amino-3-cyano-4-(m-bromo)-phenylpyrrole (II)

Following the procedure of Preparation 8 but substituting 2-amino-3'-bromoacetophenone hydrochloride (V) (prepared as in Compt. rend. *230*, 662) as starting material, yields 2 - amino-3-cyano-4-(m-bromo)phenylpyrrole (II).

Preparation 13.—2-amino-3-cyano-4-(m-chloro)-phenylpyrrole (II)

Following the procedure of Preparation 8 but substituting 2-amino-3'-chloroacetophenone hydrochloride (V) (prepared as in Compt. rend. *230*, 662) as starting material, yields 2 - amino-3-cyano-4-(m-chloro)phenylpyrrole (II).

Preparation 14.—2-amino-3-cyano-4-(m-fluoro)-phenylpyrrole (II).

Following the procedure of Preparation 8 but substituting 2-amino-3'-fluoroacetophenone hydrochloride (V) (prepared as in J. Chem. Soc. 1950, 2766) as starting material, yields 2 - amino - 3 - cyano-4-(m-fluoro)phenylpyrrole (II).

Preparation 15. — 2-amino-3-cyano-4-(o-bromo)phenyl-pyrrole (II)

Following the procedure of Preparation 8 but substituting 2-amino-2'-bromoacetophenone hydrochloride (V) (prepared as in Compt. rend. 230, 662) as starting material, yields 2-amino-3-cyano-4-(o-bromo)phenylpyrrole (II).

Preparation 16. — 2-amino-3-cyano-4-(o-chloro)phenyl-pyrrole (II)

Following the procedure of Preparation 8 but substituting 2-amino-2'-chloroacetophenone hydrochloride (V) (prepared as in Compt. rend. 230, 662) as starting material), yields 2-amino-3-cyano-4-(o-chloro)phenylpyrrole (II).

Preparation 17. — 2-amino-3-cyano-4-(o-fluoro)phenyl-pyrrole (II)

Following the procedure of Preparation 8 but substituting 2-amino-2'-fluoroacetophenone hydrochloride (V) (prepared as in J. Chem. Soc. 1950, 2766) as starting material, yields 2-amino-3-cyano-4-(o-fluoro)phenylpyrrole (II).

Preparation 18. — 2-amino-3-cyano-4-(o-methoxy)phenylpyrrole (II)

Following the procedure of Preparation 8 but substituting 2-amino-2'-methoxyacetophenone hydrochloride (V) (prepared as in Ber. 44, 1452) as starting material, yields 2-amino-3-cyano-4-(o-methoxy)phenylpyrrole (II).

Preparation 19. — 2-amino-3-cyano-4-(m-methoxy)phenylpyrrole (II)

Following the procedure of Preparation 8 but substituting 2-amino-3'-methoxyacetophenone hydrochloride (V) (prepared as in Ber. 44, 1452) as starting material, yields 2-amino-3-cyano-4-(m-methoxy)phenylpyrrole (II).

Preparation 20.—2-amino-3-cyano-4-(p-methoxy)phenyl-pyrrole (II)

Following the procedure of Preparation 8 but substituting 2-amino-4'-methoxyacetophenone hydrochloride (V) (prepared as in Ber. 44, 1452) as starting material yields 2-amino-3-cyano-4-(p-methoxy)phenylpyrrole (II).

Preparation 21. — 2-amino-3-cyano-4-(o-methyl)phenyl-pyrrole (II)

Following the procedure of Preparation 8 but substituting 2-amino-2'-methylacetophenone hydrochloride (V) (prepared as in J. Chem. Soc. 1951, 255) as starting material, yields 2-amino-3-cyano-4-(o-methyl)phenylpyrrole (II).

Preparation 22. — 2-amino-3-cyano-4-(m-methyl)phenyl-pyrrole (II)

Following the procedure of Preparation 8 but substituting 2-amino-3'-methylacetophenone hydrochloride (V) (prepared as in J. Chem. Soc. 1951, 255) as starting material, yields 2-amino-3-cyano-4-(m-methyl)phenylpyrrole (II).

Preparation 23. — 2-amino-3-cyano-4-(p-methyl)phenyl-pyrrole (II)

Following the procedure of Preparation 8 but substituting 2-amino-4'-methylacetophenone hydrochloride (V) (prepared as in J. Chem. Soc. 1951, 255) as starting material, yields 2-amino-3-cyano-4-(p-methyl)phenylpyrrole (II).

Preparation 24.—2-amino-3-cyano-5-methyl-4-phenyl-pyrrole (II)

(a) To a solution of 13.05 g. (0.08 mole) of 1-phenyl-1,2-propanedione 2-oxime (IV) (prepared as in Atti. reale ist veneto sci 10, part 2, 261) in 100 ml. of methanol and 7.78 ml. of concentrated hydrochloric acid, 200 mg. of platinum oxide catalyst is added. The resulting mixture is hydrogenated at an initial pressure of 3 atmospheres. When the uptake of hydrogen is complete, the catalyst is removed by filtration and the filtrate evaporated to dryness. The residue is first triturated with ether, then acetone, and recrystallized from ethanol-ether to give 2-aminopropiophenone hydrochloride (V).

(b) To a solution of 6.1 g. (0.033 mole) of 2-aminopropiophenone hydrochloride (V) [prepared as in (a), above] in 60 ml. of ethanol, 2 g. (0.0396 mole) of malononitrile is added. To the resulting solution, 3.35 g. (0.033 mole) of triethylamine is added with stirring at room temperature, which is continued for about 1 hour. This mixture is poured into 350 ml. of water to give a yellow precipitate that is removed by filtration and washed with water to yield 4.32 g. (66% yield) of 2-amino-3-cyano-5-methyl-4-phenylpyrrole (II), melting at 184 to 186° C.

Preparation 25.—2-amino-3-cyano-5-methyl-4-(p-chloro)phenylpyrrole (II)

Following the procedure of Preparation 24 (b) but substituting 2-amino-4'-chloropropiophenone hydrochloride (V) (prepared as in Ann. 599, 61) as starting material yields 2-amino-3-cyano-5-methyl-4-(p-chloro)phenylpyrrole (II).

Preparation 26. — 2-amino-3-cyano-5-methyl-4-(p-fluoro)phenylpyrrole (II)

Following the procedure of Preparation 24 (b) but substituting 2-amino-4'-fluoropropiophenone hydrochloride (V) (prepared as in Ann. 599, 61) as starting material, yields 2-amino-3-cyano-5-methyl-4-(p-fluoro)phenylpyrrole (II).

Preparation 27.—2-amino-3-cyano-5-methyl-4-(p-bromo)phenylpyrrole (II)

Following the procedure of Preparation 24 (b) but substituting 2-amino-4'-bromopropiophenone hydrochloride (V) (prepared as in Ann. 599, 61) as starting material, yields 2-amino-3-cyano-5-methyl-4-(p-bromo)phenylpyrrole (II).

Preparation 28.—2-amino-3-cyano-5-methyl-4-(m-chloro)-phenylpyrrole (II)

Following the procedure of Preparation 24 (b) but substituting 2-amino-3'-chloropropiophenone hydrochloride (V) (prepared as in Ann. 599, 61) as starting material, yields 2 - amino - 3 - cyano-5-methyl-4-(m-chloro)phenylpyrrole (II).

Preparation 29.—2-amino-3-cyano-5-methyl-4-(o-fluoro)-phenylpyrrole (II)

Following the procedure of Preparation 24 (b) but substituting 2-amino-2'-fluoropropiophenone hydrochloride (V) (prepared as in Ann. 599, 61) as starting material, yields 2-amino-3-cyano-5-methyl-4-(o-fluoro)phenylpyrrole (II).

Preparation 30.—2-amino-3-cyano-5-methyl-4-(m-methoxy)-phenylpyrrole (II)

Following the procedure of Preparation 24 (b) but substituting 2-amino-3'-methoxypropiophenone hydrochloride (V) (prepared as in S. African Patent 67 07, 302) as starting material, yields 2-amino-3-cyano-5-methyl-4-(m-methoxy)phenylpyrrole (II).

Preparation 31.—2-amino-3-cyano-5-methyl-4-(p-methoxy)-phenylpyrrole (II)

Following the procedure of Preparation 24(b) but substituting 3-amino-4'-methoxypropiophenone hydrochloride (V) (prepared as in S. African Patent 67 07, 302) as starting material, yields 2-amino-3-cyano-4-(p-methoxy) phenylpyrrole (II).

Preparation 32.—2-amino-3-cyano-5-methyl-4-(p-ethyl)phenylpyrrole (II)

Following the procedure of Preparation 24(b) but substituting 2-amino-4'-methylpropiophenone hydrochloride (V) [prepared as in Pharm. Bully. (Japan) 4, 182] as starting material, yields 2-amino-3-cyano-5-methyl-4-(p-methyl)-phenylpyrrole (II).

Preparation 33.—2-amino-3-cyano-5-methyl-4-(p-ethyl)phenylpyrrole (II)

Following the procedure of Preparation 24(b) but substituting 2-amino-4'-ethylpropiophenone hydrochloride (V) [prepared as in Pharm. Bull. (Japan) 4, 182] as starting material, yields 2-amino-3-cyano-5-methyl-4-(p-ethyl)phenylpyrrole (II).

Preparation 34.—2-amino-3-cyano-5-methyl-4-(m-methyl)phenylpyrrole (II)

Following the procedure of Preparation 24(b) but substituting 2-amino-3'-methylpropiophenone hydrochloride (V) [prepared as in Bull. Pharm. (Japan) 4, 182] as starting material, yields 2-amino-3-cyano-5-methyl-4-(m-methyl)phenylpyrrole (II).

Preparation 35.—2-amino-3-cyano-5-methyl-4-(o-methyl)phenylpyrrol (II)

Following the procedure of Preparation 24(b) but substituting 2-amino-2'-methylpropiophenone hydrochloride (V) [prepared as in Bull. Pharm. (Japan) 4, 182] as starting material, yields 2-amino - 3 - cyano-5-methyl-4-(o-methyl)phenylpyrrole (II).

Preparation 36.—2-amino-3-cyano-4-methylpyrrole (II)

Following the procedure of Preparation 1 but substituting 1,2-propanedione 1-oxime (also named isonitrosoacetone or pyruvaldoxime, and prepared as in J. Chem. Soc. 117, 589) as starting material, yields 2-amino-3-cyano-4-methylpyrrole (II).

Example 1.—Ethyl (3 - cyano - 4,5 - dimethyl-2-pyrryl) oxamate [also named ethyl(3-cyano-4,5-dimethylpyrrol-2-yl)oxamate] (I)

To 10 g. (0.074 mole) of 2-amino-3-cyano-4,5-dimethylpyrrole (II) (obtained as in Preparation 1) dissolved in 300 ml. of ethyl acetate, 7.59 g. of triethylamine is added. To this solution at about 0° C., 10.24 g. of ethyl oxalyl chloride in 25 ml. of ethyl acetate is added slowly with stirring. A yellow precipitate forms immediately, and the reaction mixture is stirred for about 2 hours in an ice-bath and for about 1 hour at room temperature. The triethylamine hydrochloride is removed by filtration and the filtrate stored for about 16 hours. Evaporation of the solvent under vacuum gives a reddish solid having a melting point of 110 to 120° C. Recrystallization from 95% ethanol yields 11.5 g. of bright yellow ethyl (3-cyano-4,5-dimethyl-2-pyrryl)oxamate (I), having a melting point of 132 to 133° C.

Following the procedure of Example 1 but substituting another alkyl oxalyl halide for ethyl oxalyl chloride, such as (1) methyl oxalyl chloride,
(2) propyl oxalyl chloride,
(3) isopropyl oxalyl chloride,
(4) butyl oxalyl chloride,
(5) isobutyl oxalyl chloride,
(6) pentyl oxalyl chloride,
(7) hexyl oxalyl fluoride, etc., yields respectively, (1) methyl (3-cyano - 4,5 - dimethyl-2-pyrryl)oxamate (I),
(2) propyl (3 - cyano - 4,5 - dimethyl-2-pyrryl)oxamate (I),
(3) isopropyl (3-cyano - 4,5 - dimethyl-2-pyrryl)oxamate (I),
(4) butyl (3-cyano - 4,5 - dimethyl-2-pyrryl)oxamate (I),
(5) isobutyl (3-cyano - 4,5 - dimethyl-2-pyrryl)oxamate (I),
(6) pentyl (3-cyano - 4,5 - dimethyl-2-pyrryl)oxamate (I),
(7) hexyl (3-cyano - 4,5 - dimethyl-2-pyrryl)oxamate (I), etc.

Following the procedure of Example 1 and the paragraph thereafter but employing another pyrrole (II) as starting material and reacting it with the same or another alkyl oxalyl halide, such as (1) 2-amino-3-cyano-4,5-diethylpyrrole (II) (obtained as in Preparation 2) and methyl oxalyl chloride,
(2) 2-amino - 3 - cyano-4,5-dipropylpyrrole (II) (obtained as in Preparation 3) and propyl oxalyl fluoride,
(3) 2 - amino - 3 - cyano-4,5-diisopropylpyrrole (II) (obtained as in Preparation 4) and ethyl oxalyl chloride,
(4) 2-amino - 3 - cyano-4,5-dibutylpyrrole (II) (obtained as in Preparation 5) and isopropyl oxalyl chloride,
(5) 2-amino - 3 - cyano-4,5-dipentylpyrrole (II) (obtained as in Preparation 6) and butyl oxalyl fluoride,
(6) 2-amino - 3 - cyano-4,5-dihexylpyrrole (II) (obtained as in Preparation 7) and hexyl oxalyl chloride,
(7) 2-amino - 3 - cyano-4-phenylpyrrole (II) (obtained as in Preparation 8) and ethyl oxalyl chloride,
(8) 2-amino - 3 - cyano-4-(p-bromo)phenylpyrrole (II) (obtained as in Preparation 9) and isobutyl oxalyl fluoride,
(9) 2-amino - 3 - cyano-4-(p-chloro)phenylpyrrole (II) (obtained as in Preparation 10) and methyl oxalyl chloride,
(10) 2-amino-3-cyano-4-(p-fluoro)phenylpyrrole (II) (obtained as in Preparation 11) and ethyl oxalyl chloride,
(11) 2-amino - 3 - cyano-4-(m-bromo)phenylpyrrole (II) (obtained as in Preparation 12) and propyl oxalyl chloride,
(12) 2-amino - 3 - cyano-4-(m-chloro)phenylpyrrole (II) (obtained as in Preparation 13) and hexyl oxalyl chloride,
(13) 2-amino - 3 - cyano-4-(m-fluoro)phenylpyrrole (II) (obtained as in Preparation 14) and butyl oxalyl chloride,
(14) 2-amino - 3 - cyano-4-(o-bromo)phenylpyrrole (II) (obtained as in Preparation 15) and ethyl oxalyl chloride,
(15) 2-amino - 3 - cyano-4-(o-chloro)phenylpyrrole (II) (obtained as in Preparation 16) and methyl oxalyl chloride.
(16) 2-amino - 3 - cyano-4-(o-fluoro)phenylpyrrole (II) (obtained as in Preparation 17) and ethyl oxalyl fluoride,
(17) 2-amino - 3 - cyano-4-(o-methoxy)phenylpyrrole (II) (obtained as in Preparation 18) and propyl oxalyl chloride,
(18) 2-amino - 3 - cyano-4-(m-methoxy)phenylpyrrole (II) (obtained as in Preparation 19) and pentyl oxalyl fluoride,
(19) 2-amino - 3 - cyano-4-(p-methoxy)phenylpyrrole (II) (obtained as in Preparation 20) and hexyl oxalyl chloride,
(20) 2-amino - 3- - cyano-4-(o-methyl)phenylpyrrole (II) (obtained as in Preparation 21) and butyl oxalyl fluoride,
(21) 2-amino - 3 - cyano-4-(m-methyl)phenylpyrrole (II) (obtained as in Preparation 22) and methyl oxalyl fluoride,

(22) 2-amino - 3 - cyano-4-(p-methyl)phenylpyrrole (II) (obtained as in Preparation 23) and ethyl oxalyl chloride,

(23) 2-amino - 3-cyano-5-methyl-4-phenylpyrrole (II) (obtained as in Preparation 24) and ethyl oxalyl chloride,

(24) 2-amino - 3 - cyano-5-methyl-4-(p-chloro)phenylpyrrole (II) (obtained as in Preparation 25) and methyl oxalyl chloride,

(25) 2-amino - 3 - cyano-5-methyl-4-(p-fluoro)phenylpyrrole (II) (obtained as in Preparation 26) and ethyl oxalyl chloride,

(26) 2-amino - 3 - cyano-5-methyl-4-(p-bromo)phenylpyrrole (II) (obtained as in Preparation 27) and methyl oxalyl chloride,

(27) 2-amino - 3 - cyano-5-methyl-4-(m-chloro)phenylpyrrole (II) (obtained as in Preparation 28) and methyl oxalyl fluoride,

(28) 2-amino - 3 - cyano-5-methyl-4-(o-fluoro)phenylpyrrole (II) (obtained as in Preparation 29) and ethyl oxalyl chloride,

(29) 2-amino - 3 - cyano - 5-methyl-4-(m-methoxy)phenylpyrrole (II) (obtained as in Preparation 30) and ethyl oxalyl chloride,

(30) 2-amino - 3 - cyano-5-methyl-4-(p-methoxy)phenylpyrrole (II) (obtained as in Preparation 31) and butyl oxalyl chloride,

(31) 2-amino - 3 - cyano-5-methyl-4-(p-methyl)phenylpyrrole (II) (obtained as in Preparation 32) and ethyl oxalyl chloride,

(32) 2-amino - 3 - cyano-5-methyl-4-(p-ethyl)phenylpyrrole (II) (obtained as in Preparation 33) and methyl oxalyl chloride,

(33) 2-amino - 3 - cyano-5-methyl-4-(m-methyl)phenylpyrrole (II) (obtained as in Preparation 34) and ethyl oxalyl chloride,

(34) 2-amino - 3 - cyano-5-methyl-4-(o-methyl)phenylpyrrole (II) (obtained as in Preparation 35) and ethyl oxalyl chloride,

(35) 2-amino - 3 - cyano-4-methylpyrrole (II) (obtained as in Preparation 36) and ethyl oxalyl chloride, etc., yields respectively, (1) methyl (3-cyano-4,5-diethyl-2-pyrryl)oxamate (I),
(2) propyl (3-cyano - 4,5 - dipropyl-2-pyrryl)oxamate (I),
(3) ethyl (3-cyano - 4,5 - diisopropyl-2-pyrryl)oxamate (I),
(4) isopropyl (3-cyano - 4,5 - dibutyl-2-pyrryl)oxamate (I),
(5) butyl (3-cyano - 4,5 - dipentyl-2-pyrryl)oxamate (I),
(6) hexyl (3-cyano-4,5-dihexyl-2-pyrryl)oxamate (I),
(7) ethyl (3-cyano - phenylpyrrole-2-yl)oxamate (I),
(8) isobutyl [3-cyano - 4 - (p-bromo)phenylpyrrole-2-yl]oxamate (I),
(9) methyl [3-cyano - 4 - (p-chloro)phenylpyrrol-2-yl[oxamate (I),
(10) ethyl [3-cyano - 4 - (p-fluoro)phenylpyrrol-2-yl] oxamate (I),
(11) propyl [3-cyano - 4 - (m-bromo)phenylpyrrol-2-yl[oxamate (I),
(12) hexyl [3-cyano - 4 - (m-chloro)phenylpyrrol-2-yl[oxamate (I),
(13) butyl [3-cyano - 4 - (m-fluoro)phenylpyrrol-2-yl] oxamate (I),
(14) ethyl [3-cyano - 4 - (o-bromo)phenylpyrrol-2-yl] oxamate (I),
(15) methyl [3-cyano - 4 - (o-chloro)phenylpyrrol-2-yl[oxamate (I),
(16) ethyl [3-cyano - 4 - (o-fluoro)phenylpyrrol-2-yl] oxamate (I),
(17) propyl [3-cyano - 4 - (o-methoxy)phenylpyrrol-2-yl]oxamate (I),
(18) pentyl [3-cyano - 4 - (m-methoxy)phenylpyrrol-2-yl]oxamate (I),
(19) hexyl [3-cyano - 5 - (p-methoxy)phenylpyrrol-2-yl[oxamate (I),
(20) butyl [3-cyano - 4 - (o-methyl)phenylpyrrol-2-yl] oxamate (I),
(21) methyl [3-cyano - 4 - (m-methyl)phenylpyrrol-2-yl[oxamate (I),
(22) ethyl [3-cyano - 4 - (p-methyl)phenylpyrrol-2-yl] oxamate (I),
(23) ethyl [3-cyano - 5 - methyl-4-phenylpyrrol-2-yl] oxamate (I),
(24) methyl [3-cyano - 5 - methyl-4-(p-chloro)phenylpyrrol-2-yl]oxamate (I),
(25) ethyl [3-cyano - 5 - methyl-4-(p-fluoro)phenylpyrrol-2-yl]oxamate (I),
(26) methyl [3-cyano - 5 - methyl-4-(p-bromo)phenylpyrrol-2-yl]oxamate (I),
(27) methyl [3-cyano - 5 - methyl-4-(m-chloro)phenylpyrrol-2-yl]oxamate (I),
(28) ethyl [3-cyano - 5 - methyl-4-(o-fluoro)phenylpyrrol-2-yl]oxamate (I),
(29) ethyl [3-cyano - 5 - methyl-4-(m-methoxy)phenylpyrrol-2-yl]oxamate (I),
(30) butyl [3-cyano - 5 - methyl-4-(p-methoxy)phenylpyrrol-2-yl]oxamate (I),
(31) ethyl [3-cyano - 5 - methyl-4-(p-methyl)phenylpyrrol-2-yl]oxamate (I),
(32) methyl [3-cyano - 5 - methyl-4-(p-ethyl)phenylpyrrol-2-yl]oxamate (I),
(33) ethyl [3-cyano - 5 - methyl-4-(m-methyl)phenylpyrrol-2-yl]oxamate (I),
(34) ethyl [3-cyano - 5 - methyl-4-(o-methyl)phenylpyrrol-2-yl]oxamate (I),
(35) ethyl (2-cyano - 4 - methyl-2-pyrryl)oxamate (I), etc.

Example 2 (3-cyano-4,5-dimethylpyrrol-2-yl)oxamic acid, sodium salt (Ia)

A mixture of ethyl (3-cyano-4,5-dimethyl-2-pyrrol-2-yl) oxamate (I) (obtained as in Example 1) and and 20 of 5% sodium hydroxide solution is stirred at room temperature for about 20 minutes and then filtered, the funnel being rinsed with two 5 ml. portions of 5% sodium hydroxide solution. The combined filtrate is neutralized by the addition of acetic acid. The precipitate that forms is removed by filtration and recrystallized from 50% ethanol-water to yield 1.54 g. of light tan needles of (3-cyano-4,5-dimethylpyrrol-2-yl)oxamic acid, sodium salt (Ia) melting at 245° C. (with decomposition).

*Anal.*—Calcd. for $C_9H_8N_3O_3Na$: C, 47.16; H, 3.52; N, 18.33; Na, 10.04. Found: C, 46.52; H, 3.62; N, 18.24; Na, 10.08.

Following the procedure of Example 2 but substituting another compound of Formula I as starting material, such as (1) methyl (3-cyano-4,5-diethyl-2-pyrryl)oxamate (I),
(2) propyl (3-cyano-4,5-dipropyl-2-pyrryl oxamate (I),
(3) ethyl (3-cyano-4,5-diisopropyl-2-pyrryl)oxamate (I),
(4) isopropyl (3-cyano-4,5-dibutyl-2-pyrryl)oxamate (I),
(5) butyl (3-cyano-4,5-dipentyl-2-pyrryl)oxamate (I),
(6) hexyl (3-cyano-4,5-dihexyl-2-pyrryl)oxamate (I),
(7) ethyl (3-cyano-4-phenylpyrrol-2-yl)oxamate (I),
(8) isobutyl [3-cyano-4-(p-bromo)phenylpyrrol-2-yl] oxamate (I),
(9) methyl [3-cyano-4-(p-chloro)phenylpyrrol-2-yl]-oxamate (I),
(10) ethyl [3-cyano-4-(p-fluoro)phenylpyrrol-2 - yl]-oxamate (I),
(11) propyl [3-cyano-4-(m-bromo)phenylpyrrol-2-yl]-oxamate (I),
(12) hexyl [3-cyano-4-(m-chloro)phenylpyrrol-2-yl]-oxamate (I),
(13) butyl [3-cyano-4-(m-fluoro)phenylpyrrol-2-yl]-oxamate (I),

(14) ethyl [3-cyano-4-(o-bromo)phenylpyrrol-2-yl]-oxamate (I),
(15) methyl [3-cyano-4-(o-chloro)phenylpyrrol-2-yl]-oxamate (I),
(16) ethyl [3-cyano-4-(o-fluoro)phenylpyrrol-2 - yl]-oxamate (I),
(17) propyl [3-cyano-4-(o-methoxy)phenylpyrrol - 2-yl]-oxamate (I),
(18) pentyl [3-cyano-4-(m-methoxy)phenylpyrrol - 2-yl]-oxamate (I),
(19) hexyl [3-cyano-4-(p-methoxy)phenylpyrrol-2-yl]-oxamate (I),
(20) butyl [3-cyano-4-(o-methyl)phenylpyrrol-2-yl]-oxamate (I),
(21) methyl [3-cyano-4-(m-methyl)phenylpyrrol - 2-yl]-oxamate (I),
(22) ethyl [3-cyano-4-(p-methyl)phenylpyrrol-2-yl]-oxamate (I),
(23) ethyl [3-cyano-5-methyl-4-phenylpyrrol-2 - yl]-oxamate (I),
(24) methyl [3-cyano-5-methyl-4-(p-chloro)phenylpyrrole-2-yl]oxamate (I),
(25) ethyl [3-cyano-5-methyl-4-(p-chloro)phenylpyrrol-2-yl]oxamate (I),
(26) methyl [3-cyano-5-methyl-4-(p-bromo)phenylpyrrol-2-yl]oxamate (I),
(27) methyl [3-cyano-5-methyl-4-(m-chloro)phenylpyrrol-2-yl]oxamate (I),
(28) ethyl [3-cyano-5-methyl-4-(o-fluoro)phenylpyrrol-2-yl]oxamate (I),
(29) ethyl [3-cyano-5-methyl-4-(m-methoxy)phenylpyrrol-2-yl]oxamate (I),
(30) butyl [3-cyano-5-methyl-4-(p-methoxy)phenylpyrrol-2-yl]oxamate (I),
(31) methyl [3-cyano-5-methyl-4-(p-methyl)phenylpyrrol-2-yl]oxamate (I),
(32) methyl [3-cyano-5-methyl-4-(p-ethyl)phenylpyrrol-2-yl]oxamate (I),
(33) ethyl [3-cyano-5-methyl-4-(p-methyl)phenylpyrrol-2-yl]oxamate (I),
(34) ethyl [3-cyano-5-methyl-4-(o-methyl)phenylpyrrol-2-yl]oxamate (I),
(35) ethyl (3-cyano-4-methyl-2-pyrryl)oxamate (I), etc., yields, respectively,
(1) (3-cyano-4,5 diethyl-2-pyrryl)oxamic acid, sodium salt (Ia).
(2) (3-cyano-4,5-dipropyl-2-pyrryl)oxamic acid, sodium salt (Ia),
(3) (3-cyano-4,5-diisopropyl-2-pyrryl)oxamic acid, sodium salt (Ia),
(4) (3-cyano-4,5-dibutyl-2-pyrryl)oxamic acid, sodium salt (Ia),
(5) (3-cyano-4,5-dipentyl-2-pyrryl)oxamic acid, sodium salt (Ia),
(6) (3-cyano-4,5-dihexyl-2-pyrryl)oxamic acid, sodium salt (Ia),
(7) (3-cyano-4-phenylpyrrol-2-yl)oxamic acid, sodium salt (Ia),
(8) [3-cyano-4-(p-bromo)phenylpyrrol-2 - yl]oxamic acid, sodium salt (Ia),
(9) [3-cyano-4-(p-chloro)phenylpyrrol-2 - yl]oxamic acid, sodium salt (Ia),
(10) [3-cyano-4-(p-fluoro)phenylpyrrol-2 - yl]oxamic acid, sodium salt (Ia),
(11) [3-cyano-4-(m-bromo)phenylpyrrol-2-yl]oxamic acid, sodium salt (Ia),
(12) [3-cyano-4-(m-chloro)phenylpyrrol-2-yl]oxamic acid, sodium salt (Ia),
(13) [3-cyano-4-(m-fluoro)phenylpyrrol-2 - yl]oxamic acid sodium salt (Ia),
(14) [3-cyano-4-(o-bromo)phenylpyrrol-2 - yl]oxamic acid, sodium salt (Ia),
(15) [3-cyano-4-(o-chloro)phenylpyrrol-2 - yl]oxamic acid, sodium salt (Ia),
(16) [3-cyano-4-(o-fluoro)phenylpyrrol-2 - yl]oxamic acid, sodium salt (Ia),
(17) [3-cyano-4-(o-methoxy)phenylpyrrol-2 - yl]oxamic acid, sodium salt (Ia),
(18) [3-cyano-4-(m-methoxy)phenylpyrrol-2 - yl]oxamic acid, sodium salt (Ia),
(19) [3-cyano-4-(p-methoxy)phenylpyrrol-2 - yl]oxamic acid, sodium salt (Ia),
(20) [3 - cyano - 4 - (o-methyl)phenylpyrrol-2-yl] oxamic acid, sodium salt (Ia),
(21) [3 - cyano - 4 - (m-methyl)phenylpyrrol-2-yl] oxamic acid, sodium salt (Ia),
(22) [3 - cyano - 4 - (p-methyl)phenylpyrrol-2-yl] oxamic acid, sodium salt (Ia),
(23) [3 - cyano - 4 - methyl - 4-phenylpyrrol-2-yl] oxamic acid, sodium salt (Ia),
(24) [3 - cyano - 5 - methyl-4-(p-chloro)phenylpyrrol-2-yl]oxamic acid, sodium salt (Ia),
(25) [3 - cyano - 4-methyl-4-(p-chloro)phenylpyrrol-2-yl]oxamic acid, sodium salt (Ia),
(26) [3 - cyano - 5 - methyl-4-(p-bromo)phenylpyrrol-2-yl]oxamic acid, sodium salt (Ia),
(27) [3 - cyano - 5 - methyl-4-(m-chloro)phenylpyrrol-2-yl]oxamic acid, sodium salt (Ia),
(28) [3 - cyano - 5-methyl-4-(o-fluoro)phenylpyrrol-2-yl]oxamic acid, sodium salt (Ia),
(29) [3 - cyano-5-methyl-4-(m-methoxy)phenylpyrrol-2-yl]oxamic acid, sodium salt (Ia),
(30) [3 - cyano-5-methyl-4-(p-methoxy)phenylpyrrol-2-yl]oxamic acid, sodium salt (Ia),
(31) [3 - cyano - 5-methyl-4-(p-methyl)phenylpyrrol-2-yl]oxamic acid, sodium salt (Ia),
(32) [3 - cyano - 5-methyl-4-(p-ethyl)phenylpyrrol-2-yl]oxamic acid, sodium salt (Ia),
(33) [3 - cyano - 5 -methyl-4-(p-methyl)phenylpyrrol-2-yl]oxamic acid, sodium salt (Ia),
(34) [3 - cyano - 5-methyl-4-(o-methyl)phenylpyrrol-2-yl]oxamic acid, sodium salt (Ia),
(35) (3 - cyano - 4 - methyl-2-pyrryl)oxamic acid, sodium salt (Ia), Following the procedure of the immediately preceding paragraph and of Example 2, but substituting in the latter another hydroxide (e.g., ammonium hydroxide, potassium hydroxide or calcium hydroxide) for sodium hydroxide, yields a corresponding [3-cyano-4-substituted (or 4,5-disubstituted)-2-pyrryl]oxamic acid, metal salt (Ia).

Example 3 (3-cyano-4,5-dimethylpyrrol-2-yl)oxamic acid (Ia)

A solution of 0.5 gm. of (3-cyano-4,5-dimethylpyrrol-2-yl)oxamic acid, sodium salt (Ia) (prepared as in Example 2) in 50 ml. of water is filtered. The filtrate is acidified by the addition of aqueous 1N hydrochloric acid. The yellow precipitate that forms is filtered and washed with water to give 370 mg. of product (Ia) melting at 237° C. (with decomposition). Recrystallization from ethanol gives (3-cyano-4,5-dimethylpyrrol-2-yl)oxamic acid (Ia) having a melting point of 237° C. (with decomposition).

*Analysis.*—Calcd. for $C_9H_9N_3O_3$: C, 52.17; H, 4.38; N, 20.28. Found: C, 51.71; H, 4.37; N, 19.74.

Following the procedure of Example 3 but substituting another [3-cyano-4-substituted (or 4,5-disubstituted)-pyrrol-2-yl]oxamic acid, metal salt (Ia) (obtained as in Example 2 and the paragraphs thereafter) such as (1) (3 - cyano - 4,5 - dipropylpyrrol-2-yl)oxamic acid, sodium salt (Ia),
(2) (3 - cyano - 4,5 - dipentylpyrrol-2-yl)oxamic acid, potassium salt (Ia),
(3) (3 - cyano - 4 - phenylpyrrol-2-yl)oxamic acid, calcium salt (Ia),
(4) [3 - cyano - 4-(o-fluoro)phenylpyrrol-2-yl)oxamic acid, ammonium salt (Ia),
(5) [3 - cyano-4-(m-chloro)phenylpyrrol-2-yl]oxamic acid, sodium salt (Ia), (6) [3 - cyano - 4 - (p-methoxy)phenylpyrrol-2-yl] oxamic acid, ammonium salt (Ia),
(7) [3 - cyano - 4 - (o-methyl)phenylpyrrol-2-yl] oxamic acid, potassium salt (Ia),
(8) (3 - cyano - 5 - methyl-4-phenylpyrrol-2-yl)oxamic acid, calcium salt (Ia),
(9) [3 - cyano - 5 - methyl-4-(o-fluoro)phenylpyrrol-2-yl]oxamic acid, ammonium salt (Ia),
(10) [3 - cyano-5-methyl-4-(m-methoxy)phenylpyrrol-2-yl]oxamic acid, sodium salt (Ia),
(11) [3 - cyano - 5-methyl-4-(p-methyl)phenylpyrrol-2-yl]oxamic acid, potassium salt (Ia),
(12) (3 - cyano - 4-methylpyrrol-2-yl)oxamic acid, calcium salt (Ia), etc.
yields, respectively,
(1) (3 - cyano - 4,5 - dipropylpyrrol-2-yl)oxamic acid (Ia),
(2) (3 - cyano - 4,5 - dipentylpyrrol-2-yl)oxamic acid (Ia),
(3) (3 - cyano - 4 - phenylpyrrol-2-yl)oxamic acid (Ia),
(4) [3 - cyano - 4-(o-fluoro)phenylpyrrol-2-yl]oxamic acid (Ia),
(5) [3 - cyano - 4-(m-chloro)phenylpyrrol-2-yl]oxamic acid (Ia),
(6) [3 - cyano - 4 - (p-methoxy)phenylpyrrol-2-yl] oxamic acid (Ia),
(7) [3 - cyano - 4-(o-methyl)phenylpyrrol-2-yl]oxamic acid (Ia),
(8) [3 - cyano - 5 - methyl-4-phenylpyrrol-2-yl]oxamic acid (Ia),
(9) [3 - cyano - 5 - methyl - 4 - (o-fluoro)phenylpyrrol-2-yl]oxamic acid (Ia),
(10) [3 - cyano-5-methyl-4-(m-methoxy)phenylpyrrol-2-yl]oxamic acid (Ia),
(11) [3 - cyano - 5-methyl-4-(p-methyl)phenylpyrrol-2-yl]oxamic acid (Ia),
(12) (3 - cyano - 4-methylpyrrol-2-yl)oxamic acid (Ia), etc.

Example 4 (3-cyano-4,5-dimethylpyrrol-2-yl)oxamic acid (Ia)

To 12.1 g. (0.1 mole) of 2-amino-3-cyano-4,5-dimethylpyrrole (II) (obtained as in Preparation 1) an excess of oxalic acid (0.5 mole) is added. The resulting mixture is heated at about 200° C. for about 2 hours, cooled at room temperature, and diluted with ice-water; the resulting solid is removed by filtration, washed with water, and recrystallized from ethanol, to give (3-cyano-4,5-dimethylpyrrol-2-yl)oxamic acid (Ia), having a melting point of 237° C. (with decomposition).

Following the procedure of Example 4 but employing another pyrrole (II) as starting material, such as (1) 2-amino-3-cyano-4,5-diethylpyrrole (II),
(2) 2-amino-3-cyano-4,5-dipropylpyrrole (II),
(3) 2-amino-3-cyano-4,5-diisopropylpyrrole (II),
(4) 2-amino-4-cyano-4,5-dibutylpyrrole (II),
(5) 2-amino-3-cyano-4,5-dipentylpyrrole (II),
(6) 2-amino-3-cyano-4,5-dihexylpyrrole (II),
(7) 2-amino-3-cyano-4-phenylpyrrole (II),
(8) 2-amino-3-cyano-4-(p-bromo)phenylpyrrole (II),
(9) 2-amino-3-cyano-4-(p-chloro)phenylpyrrole (II),
(10) 2-amino-3-cyano-4-(p-fluoro)phenylpyrrole (II),
(11) 2-amino-3-cyano-4-(m-bromo)phenylpyrrole (II),
(12) 2-amino-3-cyano-4-(m-chloro)phenylpyrrole (II),
(13) 2-amino-3-cyano-4-(m-fluoro)phenylpyrrole (II),
(14) 2-amino-3-cyano-4-(o-bromo)phenylpyrrole (II),
(15) 2-amino-3-cyano-4-(o-chloro)phenylpyrrole (II),
(16) 2-amino-3-cyano-4-(o-fluoro)phenylpyrrole (II),
(17) 2-amino - 3 - cyano-4-(o-methoxy)phenylpyrrole (II),
(18) 2-amino - 3 - cyano-4-(m-methoxy)phenylpyrrole (II),
(19) 2-amino - 3 - cyano-4-(p-methoxy)phenylpyrrole (II),
(20) 2-amino-3-cyano-4-(o-methyl)phenylpyrrole (II),
(21) 2-amino-3-cyano-4-(m-methyl)phenylpyrrole (II),
(22) 2-amino-3-cyano-4-(p-methyl)phenylpyrrole (II),
(23) 2-amino-3-cyano-5-methyl-4-phenylpyrrole (II),
(24) 2-amino-3-cyano-5-methyl-4-(p-chloro)phenylpyrrole (II),
(25) 2-amino-3-cyano-5-methyl-4-(p-fluoro)phenylpyrrole (II),
(26) 2-amino-3-cyano-5-methyl-4-(p-bromo)phenylpyrrole (II),
(27) 2 - amino-3-cyano-5-methyl-4-(m-chloro)phenylpyrrole (II),
(28) 2-amino - 3 - cyano-5-methyl-4-(o-fluoro)phenylpyrrole (II),
(29) 2 - amino - 3 - cyano-5-methyl-4-(m-methoxy) phenylpyrrole (II),
(30) 2-amino-3-cyano-5-methyl-4-(p-methoxy)phenylpyrrole (II),
(31) 2 - amino-3-cyano-5-methyl-4-(p-methyl)phenylpyrrole (II),
(32) 2-amino - 3 - cyano-5-methyl-4-(p-ethyl)phenylpyrrole (II),
(33) 2 - amino-3-cyano-5-methyl-4-(m-methyl)phenylpyrrole (II),
(34) 2 - amino-3-cyano-5-methyl-4-(o-methyl)phenylpyrrole (II),
(35) 2-amino-3-cyano-4-methylpyrrole (II) etc., yields respectively,
(1) (3-cyano-4,5-diethyl-2-pyrryl)oxamic acid (Ia),
(2) (3-cyano-4,5-dipropyl-2-pyrryl)oxamic acid (Ia),
(3) (3-cyano-4,5-diisopropyl - 2 - pyrryl)oxamic acid (Ia),
(4) (3-cyano-4,5-dibutyl-2-pyrryl)oxamic acid (Ia),
(5) (3-cyano-4,5-dipentyl-2-pyrryl)oxamic acid (Ia),
(6) (3-cyano-4,5-dihexyl-2-pyrryl)oxamic acid (Ia),
(7) (3-cyano-4-phenylpyrrol-2-yl)oxamic acid (Ia),
(8) [3 - cyano-4-(p-bromo)phenylpyrrol-2-yl]oxamic acid (Ia),
(9) [3 - cyano-4-(p-chloro)phenylpyrrol-2-yl]oxamic acid (Ia),
(10) [3-cyano-4-(p-fluoro)phenylpyrrol-2 - yl]oxamic acid (Ia),
(11) [3 - cyano-4-(m-bromo)phenylpyrrol-2-yl]oxamic acid (Ia),
(12) [3 - cyano-4-(m-chloro)phenylpyrrol-2-yl]oxamic acid (Ia),
(13) [3 - cyano-4-(m-fluoro)phenylpyrrol-2-yl]oxamic acid (Ia),
(14) [3 - cyano-4-(o-bromo)phenylpyrrol-2-yl]oxamic acid (Ia),
(15) [3 - cyano-4-(o-chloro)phenylpyrrol-2-yl]oxamic acid (Ia),
(16) [3 - cyano-4-(o-fluoro)phenylpyrrol-2-yl]oxamic acid (Ia),
(17) [3-cyano-4-(o-methoxy)phenylpyrrol-2-yl]oxamic acid (Ia),
(18) [3-cyano - 4 - (m-methoxy)phenylpyrrol-2-yl] oxamic acid (Ia),
(19) [3-cyano-4-(p-methoxy)phenylpyrrol-2-yl]oxamic acid (Ia),
(20) [3 - cyano-4-(o-methyl)phenylpyrrol-2-yl]oxamic acid (Ia),
(21) [3-cyano-4-(m-methyl)phenylpyrrol-2-yl]oxamic acid (Ia),
(22) [3-cyano-4-(p-methyl)phenylpyrrol-2-yl]oxamic acid (Ia),
(23) [3 - cyano-4-methyl-4-phenylpyrrol-2-yl]oxamic acid (Ia),
(24) [3 - cyano-4-methyl-4-(p-chloro)phenylpyrrol-2-yl]oxamic acid (Ia),
(25) [3-cyano-4-methyl-4-(p-fluoro)phenylpyrrol-2-yl] oxamic acid (Ia),
(26) [3 - cyano-5-methyl-4-(p-bromo)phenylpyrrol-2-yl]oxamic acid (Ia),
(27) [3 - cyano-5-methyl-4-(m-chloro)phenylpyrrol-2-yl]oxamic acid (Ia),

(28) [3-cyano-5-methyl-4-(o-fluoro)phenylpyrrol-2-yl] oxamic acid (Ia),
(29) [3-cyano-5-methyl-4-(m-methoxy)phenylpyrrol-2-yl]oxamic acid (Ia),
(30) [3-cyano-5-methyl-4-(p-methoxy)phenylpyrrol-2-yl]oxamic acid (Ia),
(31) [3 - cyano-5-methyl-4-(p-methyl)phenylpyrrol-2-yl]oxamic acid (Ia),
(32) [3-cyano - 5 - methyl-4-(p-ethyl)phenylpyrrol-2-yl]oxamic acid (Ia),
(33) [3 - cyano-5-methyl-4-(m-methyl)phenylpyrrol-2-yl]oxamic acid (Ia),
(34) [3 - cyano-5-methyl-4-(o-methyl)phenylpyrrol-2-yl]oxamic acid (Ia),
(35) (3-cyano-4-methyl-2-pyrryl)oxamic acid (Ia), etc.

Example 5 (3-cyano-4,5-dimethyl-1-phenylpyrrol-2-yl) oxamic acid (Ia) and sodium salt (Ia) thereof (a) 3-anilino-2-butanone (III)

A mixture of 21.5 g. (0.2 mole) of 3-hydroxy-2-butanone (IVa) (prepared as in Ann. 436, 173), 18.63 g. (0.2 mole) of aniline (IVb) and 1 g. of formic acid is stirred and heated on a steam bath for about 1 hour. The mixture is cooled to room temperature, about 200 ml. of benzene added and the mixture refluxed for about 4 hours. The reaction mixture is cooled to room temperature where it remains for about 48 hours. The solution is evaporated to dryness and evaporated under vacuum to give 32.6 g. (100% yield) of an oil. Its distillation through a 6 inch Vigreux column yields 23.8 g. of 3-anilino-2-butanone (V), a yellow oil boiling at 106° C./0.5 mm. Hg. The infrared and nuclear magnetic resonance (NMR) spectra are in agreement with the proposed structure of the compound (V).

(b) 2-amino-3-cyano-4,5-dimethyl-1-phenylpyrrole (II)

To a solution of 8.15 g. (0.05 mole) of 3-anilino-2-butanone (V) [prepared as in (a), above] in 50 ml. of methanol, cooled to 5° C. in an ice bath, 13.2 g. (0.2 mole) of malononitrile is added. The reaction mixture is stirred at room temperature for about 15 minutes and at 50° C. in a water bath for about 2 hours. The solution is cooled to room temperature and then poured into about 250 ml. of ice-water. The resulting precipitate is filtered to give 8.28 g. (78% yield) of material (II) melting at 125 to 128° C. The white precipitate is recrystallized from ethanol-water to give 7.41 g. (70% yield) of colorless prisms of 2-amino-3-cyano-4,5-dimethyl-1-phenylpyrrole (II) melting at 125 to 126° C. Ultraviolet absorption:

$$\lambda_{max}^{dioxane} \ 241 \ m\mu \ (\epsilon = 41,600),$$

Sl. Sh. (6,350) mp. The infrared and NMR spectra are in agreement with the proposed structure of the compound (II).

Analysis.—Calcd. for $C_{13}H_{13}N_3$: C, 73.90; H, 6.20; N, 19.89. Found: C, 73.68; H, 6.24; N, 20.07.

(c) Ethyl (3-cyano-4,5-dimethyl-1-phenylpyrrol-2-yl)oxamate (I)

To a solution of 6.33 g. (0.03 mole) of 2-amino-3-cyano-4,5-dimethyl-1-phenylpyrrole (II) [obtained as in (b), above] in 100 ml. of dry ethyl acetate (dried over a molecular sieve) and 3.03 g. (0.03 mole) of triethylamine, cooled to about 0° C. in an ice bath, a solution of 4.2 g. of ethyl oxalyl chloride dissolved in 25 ml. of dry ethyl acetate is added dropwise. The mixture is stirred for about 1 hour at ice bath temperature, then for about 4 hours at room temperature and allowed to stand at room temperature for about 16 hours. The mixture is filtered and the precipitate is washed with a small amount of dry ethyl acetate. The filtrate is evaporated to dryness to yield an oily residue of ethyl (3-cyano-4,5-dimethyl-1-phenylpyrrol-2-yl)oxamate (I).

Following the procedure of (c), above, but substituting another alkyl oxalyl halide for ethyl oxalyl chloride, such as (1) methyl oxalyl chloride,
(2) propyl oxalyl fluoride,
(3) butyl oxalyl chloride,
(4) hexyl oxalyl fluoride, etc.

yields, respectively, (1) methyl (3-cyano-4,5-dimethyl - 1 - phenylpyrrol-2-yl)oxamate (I),
(2) propyl (3-cyano-4,5-dimethyl - 1 - phenylpyrrol-2-yl)oxamate (I),
(3) butyl (3 - cyano-4,5-dimethyl-1-phenylpyrrol-2-yl) oxamate (I),
(4) hexyl (3 - cyano-4,5-dimethyl-1-phenylpyrrol-2-yl) oxamate (I), etc.

(d) (3-cyano-4,5-dimethyl-1-phenylpyrrol-2-yl)oxamic acid, sodium salt (Ia)

A suspension of ethyl (3-cyano-4,5-dimethyl-1-phenylpyrrol-2-yl)oxamate (I) [obtained as in (c), above] and 60 ml. of 5% sodium hydroxide solution is stirred at room temperature for about 2 hours. After treatment with Celite (diatomaceous earth) prior to filtration, the filtrate is evaporated to dryness to give (3-cyano-4,5-dimethyl-1-phenylpyrrol-2-yl)oxamic acid, sodium salt (Ia).

Following the procedure of (d), above, but substituting another hydroxide (e.g., ammonium hydroxide, potassium hydroxide, or calcium hydroxide) for sodium hydroxide, yields a corresponding (3-cyano-4,5-dimethyl-1-phenylpyrrol-2-yl)oxamic acid, metal salt (Ia).

(e) (3-cyano-4,5-dimethyl-1-phenylpyrrol-2-yl)oxamic acid (Ia)

The filtrate of (3-cyano-4,5-dimethyl-1-phenylpyrrol-2-yl)oxamic acid, sodium salt (Ia), [from (d), above] is acidified with concentrated hydrochloric acid. The grey precipitate that forms is removed by filtration and washed with water. It is purified by dissolving in aqueous sodium bicarbonate solution, filtering the solution and reacidifying with 1N hydrochloric acid to give 3.51 g. of grey solid (3-cyano-4,5-dimethyl - 1 - phenylpyrrol-2-yl)oxamic acid (Ia), melting at 189° C. (with decomposition). The infrared and NMR spectra are in agreement with the proposed structure of the compound (Ia).

Following the procedure of Example 5 but substituting another 3-hydroxy-2-alkanone (IVa) for 3-hydroxy-2-butanone (IVa), such as (1) hydroxy-2-propanone (IVa) (prepared as in J. Chem. Soc. 59, 787),
(2) 3-hydroxy-2-pentanone (IVa) (prepared as in Bull. soc. chim. 39, 216),
(3) 3-hydroxy-2-hexanone (IVa) (prepared as in Bull. soc. roy. sci. Liege 24, 2), etc.

yields, respectively, (1) (3-cyano-4-methyl - 1 - phenylpyrrol-2-yl)oxamic acid (Ia) and a metal salt (Ia) thereof,
(2) (3-cyano-4-methyl - 5 - ethyl-1-phenylpyrrol-2-yl) oxamic acid (Ia), and a metal salt (Ia) thereof,
(3) (3 - cyano-4-methyl-5-propyl-1-phenylpyrrol-2-yl) oxamic acid (Ia) and a metal salt (Ia) thereof, etc.

Following the procedure of Example 5 but substituting another amine (IVb) for aniline (IVb), such as (1) methylamine (IVb) [prepared as in Org. Syn. 3, 67 (1923)],
(2) ethylamine (IVb) [prepared as in J. Amer. Chem. Soc. 69, 836],
(3) propylamine (IVb) [prepared as in J. Amer. Chem. Soc. 74, 6824],
(4) butylamine (IVb) [prepared as in Org. Syn. coll. vol. 2, 319 (1942)],
(5) pentylamine (IVb) [prepared as in J. Amer. Chem. Soc. 77, 2544], (6) hexylamine (IVb) [prepared as in Ber. *43*, 3599],
(7) o-bromoaniline (IVb) [prepared as in J. Chem. Soc. 1925, 494],
(8) m-bromoaniline (IVb) [prepared as in Bull. soc. chim. *7*, 955],
(9) p-bromoaniline (IVb) [prepared as in Gazz. Chim. ital. *58*, 233],
(10) o-chloroaniline (IVb) [prepared as in J. Chem. Soc. 1921, 1013],
(11) m-chloroaniline (IVb) (ibid.),
(12) p-chloroaniline (IVb) (ibid.),
(13) o-fluoroaniline (IVb) [prepared as in Ber. *64*, 2469],
(14) m-fluoroaniline (IVb) (prepared as in J. Chem. Soc. 1928, 421),
(15) p-fluoroaniline (IVb) (prepared as in Ber. *62*, 3041),
(16) o-methoxyaniline (IVb) [prepared as in Chem. Zentr. I, 3317 (1926)],
(17) m-methoxyaniline (IVb) (prepared as in Ber. *47*, 1537),
(18) p-methoxyaniline (IVb) (prepared as in J. Org. Chem. *9*, 1),
(19) o-methylaniline (or o-toluidine) (prepared as in J. Amer. Chem. Soc. *48*, 2163),
(20) m-methylaniline (or m-toluidine) (prepared as in Ber. *22*, 840),
(21) p-methylaniline (or p-toluidine) (prepared as in Rec. trav. chim. *28*, 109),
(22) $\alpha,\alpha,\alpha$-trifluoro-o-toluidine (or o-trifluoromethylaniline) (prepared as in French Patent 805,704),
(23) $\alpha,\alpha,\alpha$-trifluoro-m-toluidine (or m-trifluoromethylaniline) (prepared as in J. Amer. Chem. Soc. *68*, 1602),
(24) $\alpha,\alpha,\alpha$-trifluoro-p-toluidine (or p-trifluoromethylaniline) (prepared as in Rec. trav. chim. *28*, 109), etc., yields, respectively, (1) (3 - cyano - 4,5 - dimethyl - 1 - methylpyrrol-2-yl)oxamic acid (Ia) and a metal salt thereof (Ia),
(2) (3 - cyano - 4,5 - dimethyl - 1 - ethylpyrrol-2-yl)oxamic acid (Ia) and a metal salt (Ia) thereof,
(3) (3 - cyano - 4,5 - dimethyl - 1 - propylpyrrol-2-yl)oxamic acid (Ia) and a metal salt (Ia) thereof,
(4) (3 - cyano - 4,5 - dimethyl - 1 - butylpyrrol-2-yl)oxamic acid (Ia) and a metal salt (Ia) thereof,
(5) (3 - cyano - 4,5 - dimethyl - 1 - pentylpyrrol-2-yl)oxamic acid (Ia) and a metal salt (Ia) thereof,
(6) (3 - cyano - 4,5 - dimethyl - 1 - hexylpyrrol-2-yl)oxamic acid (Ia) and a metal salt (Ia) thereof,
(7) [3 - cyano - 4,5 - dimethyl - 1 - (o-bromoanilino)pyrrol - 2 - yl]oxamic acid (Ia) and a metal salt (Ia) thereof,
(8) [3 - cyano - 4,5 - dimethyl - 1 - (m-bromoanilino)pyrrol - 2 - yl]oxamic acid (Ia) and a metal salt (Ia) thereof,
(9) [3 - cyano - 4,5 - dimethyl - 1 - (p-bromoanilino)pyrrol - 2 - yl]oxamic acid (Ia) and a metal salt (Ia) thereof,
(10) [3 - cyano - 4,5 - dimethyl - 1 - (o-chloroanilino)pyrrol - 2 - yl]oxamic acid (Ia) and a metal salt (Ia) thereof,
(11) [3 - cyano - 4,5 - dimethyl - 1 - (m-chloroanilino)pyrrol - 2 - yl]oxamic acid (Ia) and a metal salt (Ia) thereof,
(12) [3 - cyano - 4,5 - dimethyl - 1 - (p-chloroanilino)pyrrol - 2 - yl]oxamic acid (Ia) and a metal salt (Ia) thereof,
(13) [3 - cyano - 4,5 - dimethyl - 1 - (o-fluoroanilino)pyrrol - 2 - yl]oxamic acid (Ia) and a metal salt (Ia) thereof,
(14) [3 - cyano - 4,5 - dimethyl - 1 - (m-fluoroanilino)pyrrol - 2 - yl]oxamic acid (Ia) and a metal salt (Ia) thereof,
(15) [3 - cyano - 4,5 - dimethyl - 1 - (p-fluoroanilino)pyrrol - 2 - yl]oxamic acid (Ia) and a metal salt (Ia) thereof,
(16) [3 - cyano - 4,5 - dimethyl - 1 - (o-methoxyanilino)pyrrol - 2 - yl]oxamic acid (Ia) and a metal salt (Ia) thereof,
(17) [3 - cyano - 4,5 - dimethyl - 1 - (m-methoxyanilino)pyrrol - 2 - ]oxamic acid (Ia) and a metal salt (Ia) thereof,
(18) [3 - cyano - 4,5 - dimethyl - 1 - (p-methoxyanilino)pyrrol - 2 - yl]oxamic acid (Ia) and a metal salt (Ia) thereof,
(19) [3 - cyano - 4,5 - dimethyl - 1 - (o-methylanilino)pyrrol - 2 - yl]oxamic acid (Ia) and a metal salt (Ia) thereof,
(20) [3 - cyano - 4,5 - dimethyl-1-(m-methylanilino)pyrrol - 2 - yl]oxamic acid (Ia) and a metal salt (Ia) thereof,
(21) [3 - cyano - 4,5 - dimethyl - 1 - (p-methylanilino)pyrrol - 2 - yl]oxamic acid (Ia) and a metal salt (Ia) thereof,
(22) [3 - cyano - 4,5 - dimethyl - 1 - ($\alpha,\alpha,\alpha$-trifluoro-o-toluidino)pyrrol - 2 - yl]oxamic acid (Ia) and a metal salt (Ia) thereof,
(23) [3 - cyano - 4,5 - dimethyl - 1 - ($\alpha,\alpha,\alpha$-trifluoro-m-toluidino)pyrrol - 2 - yl]oxamic acid (Ia) and a metal salt (Ia) thereof,
(24) [3 - cyano - 4,5 - dimethyl - 1 - ($\alpha,\alpha,\alpha$-trifluoro-p-toluidino)pyrrol-2-yl]oxamic acid (Ia) and a metal salt (Ia) thereof, etc.

Following the procedure of Example 5 but substituting another 3-hydroxy-2-alkanone (IVa) for 3-hydroxy-2-butanone (IVa) and another amine (IVb) for aniline (IVb), such as (1) hydroxy - 2 - propanone (IVa) and butylamine (IVb),
(2) hydroxy - 2 - propanone (IVa) and hexylamine (IVb),
(3) hydroxy - 2 - propanone (IVa) and o-bromoaniline (IVb),
(4) hydroxy - 2 - propanone (IVa) and m-chloroaniline (IVb),
(5) hydroxy - 2 - propanone (IVa) and p-fluoraniline (IVb),
(6) hydroxy - 2 - propanone (IVa) and o-methoxyaniline (IVb),
(7) hydroxy - 2 - propanone (IVa) and m-methylaniline (IVb),
(8) hydroxy - 2-propanone (IVa) and $\alpha,\alpha,\alpha$-trifluoro-o-toluidine,
(9) 3-hydroxy - 2 - pentanone (IVa) and propylamine (IVb),
(10) 3 - hydroxy - 2 - pentanone (IVa) and pentylamine (IVb),
(11) 3 - hydroxy - 2 - pentanone (IVa) and p-bromoaniline (IVb),
(12) 3 - hydroxy - 2 - pentanone (IVa) and o-chloroaniline (IVb),
(13) 3 - hydroxy - 2 - pentanone (IVa) and m-fluoroaniline (IVb),
(14) 3 - hydroxy - 2-pentanone (IVa) and p-methoxyaniline (IVb),
(15) 3 - hydroxy - 2 - pentanone (IVa) and o-methylaniline (IVb),
(16) 3 - hydroxy - 2 - pentanone (IVa) and $\alpha,\alpha,\alpha$-trifluoro-m-toluidine (IVb),
(17) 3 - hydroxy - 2 - hexanone (IVa) and methylamine (IVb),
(18) 3 - hydroxy - 2 - hexanone (IVa) and ethylamine (IVb),
(19) 3 - hydroxy - 2 - hexanone (IVa) and m-bromoaniline (IVb),
(20) 3 - hydroxy - 2 - hexanone (IVb) and p-chloroaniline (IVb),
(21) 3 - hydroxy - 2 - hexanone (IVa) and o-fluoroaniline (IVb),
(22) 3 - hydroxy - 2-hexanone (IVa) and m-methoxyaniline (IVb),

(23) 3 - hydroxy - 2 - hexanone (IVa) and p-methylaniline (IVb),

(24) 3 - hydroxy - 2 - hexanone (IVa) and α,α,α-trifluoro-p-toluidine (IVb), etc.

yields, respectively, (1) (3 - cyano - 4 - methyl - 1 - butylpyrrol - 2 - yl) oxamic acid (Ia) and a metal salt (Ia) thereof, (2) (3-cyano - 4 - methyl-1-hexylpyrrol-2-yl)oxamic acid (Ia) and a metal salt (Ia) thereof, (3) [3-cyano - 4 - methyl-1-(o-bromoanilino)pyrrol-2-yl]oxamic acid (Ia) and a metal salt (Ia) thereof, (4) [3-cyano - 4 - methyl-1-(m-chloroanilino)pyrrol-2-yl]oxamic acid (Ia) and a metal salt (Ia) thereof, (5) [3-cyano - 4 - methyl-1-(p-fluoroanilino)pyrrol-2-yl]oxamic acid (Ia) and a metal salt (Ia) thereof, (6) [3-cyano - 4 - methyl-1-(o-methoxyanilino)pyrrol-2-yl]oxamic acid (Ia) and a metal salt (Ia) thereof, (7) [3-cyano - 4 - methyl-1-(m-methylanilino)pyrrol-2-yl]oxamic acid (Ia) and a metal salt (Ia) thereof, (8) [3 - cyano - 4 - methyl-1-(α,α,α-trifluoro-o-toluidino)pyrrol-2-yl]oxamic acid (Ia) and a metal salt (Ia) thereof, (9) (3-cyano - 4 - methyl-5-ethyl-1-propylpyrrol-2-yl) oxamic acid (Ia) and a metal salt (Ia) thereof,

(10) (3-cyano - 4 - methyl-5-ethyl-1-pentylpyrrol-2-yl)oxamic acid (Ia) and a metal salt (Ia) thereof,

(11) [3-cyano - 4 - methyl-5-ethyl-1-(p-bromoanilino)pyrrol-2-yl]oxamic acid (Ia) and a metal salt (Ia) thereof,

(12) [3-cyano - 4 - methyl-5-ethyl-1-(o-chloroanilino)pyrrol-2-yl]oxamic acid (Ia) and a metal salt (Ia) thereof,

(13) [3-cyano - 4 - methyl-5-ethyl-1-(m-fluoroanilino)pyrrol-2-yl]oxamic acid (Ia) and a metal salt (Ia) thereof,

(14) [3-cyano - 4 - methyl-5-ethyl-1-(p-methoxyanilino)pyrrol-2-yl]oxamic acid (Ia) and a metal salt (Ia) thereof,

(15) [3-cyano - 4 - methyl-5-ethyl-1-(o-methylanilino)pyrrol-2-yl]oxamic acid (Ia) and a metal salt (Ia) thereof,

(16) [3-cyano - 4 - methyl-5-ethyl-1-(α,α,α-trifluoro-m-toluidino)pyrrol-2-yl]oxamic acid (Ia) and a metal salt thereof,

(17) (3-cyano - 4 - methyl-5-propyl-1-methylpyrrol-2-yl)oxamic acid (Ia) and a metal salt (Ia) thereof,

(18) (3-cyano - 4 - methyl-5-propyl-1-ethylpyrrol-2-yl)oxamic acid (Ia) and a metal salt (Ia) thereof,

(19) [3 - cyano-4-methyl-5-propyl-1-(m-bromoanilino) pyrrol-2-yl]oxamic acid (Ia) and a metal salt (Ia) thereof,

(20) [3-cyano - 4 - methyl-5-propyl-1-(p-chloroanilino)pyrrol-2-yl]oxamic acid (Ia) and a metal salt (Ia) thereof,

(21) [3-cyano-4 - methyl-5-propyl-1-(o-fluoroanilino) pyrrol-2-yl]oxamic acid (Ia) and a metal salt (Ia) thereof,

(22) [3-cyano - 4 - methyl-5-propyl-1-(m-methoxyanilino)propyl-2-yl]oxamic acid (Ia) and a metal salt (Ia) thereof,

(23) [3-cyano - 4 - methyl-5-propyl-1-(p-methylanilino)pyrrol-2-yl]oxamic acid (Ia) and a metal salt (Ia) thereof,

(24) [3-cyano - 4 - methyl-5-propyl-1-(α,α,α-trifluoro-p-toluidino)pyrrol-2-yl]oxamic acid (Ia) and a metal salt (Ia) thereof, etc.

The compositions of the present invention are presented for administration to humans and animals in unit dosage forms, such as tablets, capsules, pills, powders, granules, suppositories, syrups, elixirs, drops, sterile parenteral solutions or suspensions, and oral solutions or suspensions, and oil-in-water and water-in-oil emulsions containing suitable quantities of the compound of Formula Ia. The preferred method of administration is by inhalation into the lung by means of a liquid aerosol or powder for insufflation.

For oral administration either solid or fluid unit dosage forms can be prepared. For preparing solid compositions such as tablets, the compound of Formula Ia is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft getlatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared in an aqueous vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The preferred compositions are those adapted for inhalation into the lung and containing a water soluble form of a compound of Formula Ia.

Compositions for inhalation are of three basic types: (1) a powder mixture preferably micro-pulverized; (2) an aqueous solution to be sprayed with a nebulizer; and (3) an aerosol with volatile propellant in a pressurized container.

The powders are quite simply prepared by mixing a compound of Formula Ia with a solid diluent which is compatible with lung tissue, preferably lactose. The powders are packaged in a device adapted to emit a measured amount of powder when inhaled through the mouth.

Aqueous solutions are prepared by dissolving the compound of Formula Ia where M is aluminium, ammonium, sodium, potassium or *tris*-(hydroxymethyl)methyl ammonium in water and adding salt to provide an isotonic solution and buffering to a pH compatible with inhalation. The solutions are dispersed in a spray device or nebulizer and sprayed into the mouth while inhaling.

Aerosols are prepared by dissolving a compound of Formula Ia where M-aluminum, ammonium, sodium potassium or *tris*(hydroxymethyl)methyl ammonium in water or ethanol and mixing with a volatile propellant and placing in a pressurized container having a metering valve to release a predetermined amount of material.

The liquefied propellant employed is one which has a boiling point 65° F. at atmospheric pressure. For use in compositions intended to produce aerosols for medicinal or cosmetic use, the liquefied propellant should be non-toxic. Among the suitable liquefied propellants which may be employed are the lower alkanes containing up to five carbon atoms, such as butane and pentane, or a lower alkyl chloride, such as methyl, ethyl, or propyl chlorides. Suitable liquefied propellants are the fluorinated and fluorochlorinated lower alkanes such as are sold under the trademarks "Freon" and "Genetron." Mixtures of the above-mentioned propellants may suitably be employed. Examples of these propellants are dichlorodifluoromethane ("Freon 12") dichlorotetrafluoroethane ("Freon 114"), trichloromonofluoromethane ("Freon 11"), dichloromonofluoromethane ("Freon 21") monochlorodifluoromethane ("Freon 22"), trichlorotrifluoroethane ("Freon 113"), difluoroethane ("Genetron 142–A") and monochlorotrifluoromethane ("Freon 13"). Alternatively, the inhalation compositions of this invention can be dispensed from pressure-loaded vessels, e.g., by use of compressed air or carbon dioxide cartridges.

The term "unit dosage form," as used in the specification and claims, refers to physically discrete units suitable as unitary dosages for human subjects and animals, each unit containing a predetermined quantity of active material calculated to produce the desired therapeutic effect in association with the required pharmaceutical diluent, carrier, or vehicle. The specification for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonfuls, tablespoonfuls, dropperfuls, ampuls, vials, aerosols with metered discharges, segregated multiples of the foregoing, and other forms as herein described.

The dosage of the compound of Formula Ia for treatment depends on the route of administration. A dosage schedule of from about 0.1 to 50 mg. in a single dose, administered parenterally or by inhalation, embraces the effective range for preventing allergic attack for which the compositions are effective. The dosage to be administered is repeated up to 6 times daily. The oral dose is from about 0.1 to about 500 mg. in a single dose.

Alternatively, the compounds of Formula Ia in suitable pharmaceutical compositions can be administered first as a priming dose to adequately mitigate and control the allergic symptoms, followed by maintenance doses consisting of dosages of much reduced amounts of drugs, e.g., from about 1/200th to about 1/10th of the amounts of drug of the priming dose, preferably from about 1/50th to about 1/20th, in a suitable pharmaceutical composition and at suitable intervals, e.g., 4 times daily, to maintain the antiallergic prophylaxis, as prescribed by the attending physician.

The administration of the compositions of the present invention to humans and animals provides a method for the prophylactic treatment of allergy for all anaphylactic reactions of a reagin- and non-reagin mediated nature. That is to say, these compositions when administered to a sensitized individual prior to the time that the individual comes into contact with substances to which he is allergic, the compositions will prevent the allergic reaction which would otherwise occur.

For example, the process can be used for prophylactic treatment of such chronic condiitons as bronchial asthma, allergic rhinitis, food allergy, hay fever, urticaria, and auto-immune diseases.

Example 6

A lot of 10,000 tablets, each containing 0.1 mg. of (3-cyano-4,5-dimethyl-2-pyrryl)oxamic acid, sodium salt (Ia) is prepared from the following types and amounts of ingredients:

| | Gm. |
|---|---|
| (3-Cyano-4,5-dimethyl-2-pyrryl)oxamic acid, sodium salt (Ia) | 1 |
| Dicalcium phosphate | 1,500 |
| Methylcellulose, U.S.P. (15 cps.) | 60 |
| Talc | 150 |
| Corn Starch | 200 |
| Calcium stearate | 12 |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in preventing hay fever attacks at a dose of 1 tablet every four hours.

Example 7

One thousand two-piece hard gelatin capsules, each containing 100 mg. of (3-cyano-4,5-dimethyl-2-pyrryl)-oxamic acid, sodium salt (Ia) are prepared from the following types and amounts of ingredients:

| | Gm. |
|---|---|
| (3-cyano-4,5-dimethyl-2-pyrryl)oxamic acid, sodium salt (Ia), micronized | 100 |
| Talc | 10 |
| Magnesium stearate | 0.5 |

The ingredients are mixed well and filled into capsules of the proper size.

Capsules so prepared are useful in preventing attacks of bronchial asthma at a dose of one capsule every 4 to 6 hours.

Example 8

One thousand tablets, each containing 500 mg. of (3-cyano-4,5-dimethyl-2-pyrryl)oxamic acid, sodium salt (Ia) are made from the following types and amounts of ingredients:

| | Gm. |
|---|---|
| (3-cyano-4,5-dimethyl-2-pyrryl)oxamic acid, sodium salt (Ia) | 500 |
| Microcrystalline cellulose NF | 120 |
| Starch | 16 |
| Magnesium stearate powder | 4 |

The ingredients are screened and blended together and pressed into 640 mg. tablets.

The tablets are useful to protect against food allergy at a dose of 1 tablet before meals.

Example 9

A sterile preparation suitable for intramuscular injection and containing 1 mg. of (3-cyano-4,5-dimethyl-2-pyrryl)oxamic acid, sodium salt (Ia) in each milliliter is prepared from the following ingredients:

| | | |
|---|---|---|
| (3-cyano-4,5-dimethyl-2-pyrryl)oxamic acid, sodium salt (Ia) | gm | 1 |
| Benzyl benzoate | gm | 200 |
| Methylparaben | gm | 1.5 |
| Propylparaben | gm | 0.5 |
| Cottonseed oil q.s. | ml | 1,000 |

One milliliter of this sterile preparation is injected intramuscularly for prophylactic treatment of allergic rhinitis.

Example 10 Aqueous Solution 600 ml. of an aqueous solution containing 0.1 mg. of (3-cyano-4,5-dimethyl-2-pyrryl)oxamic acid, sodium salt (Ia) per ml. is prepared as follows:

(3-cyano-4,5-dimethyl-2-pyrryl)oxamic acid, sodium salt (Ia) _____ mg__ 60
Sodium chloride _____ mg__ 5,400
Water for injection q.s. _____ ml__ 600

The oxamic acid, sodium salt (Ia) and sodium chloride are dissolved in sufficient water to make 600 ml. and sterile filtered.

The solution is placed in nebulizers designed to deliver 0.25 ml. of solution per spray.

The solution is sprayed into the lungs every 4 to 6 hours for prevention of asthmatic attacks.

Following the procedure of Example 10, but substituting an appropriate amount of the tris (hydroxymethyl) aminomethane (THAM) salt of (3-cyano-4,5-dimethyl-2-pyrryl)-oxamic acid, sodium salt (Ia), provides an aqueous solution that can be similarly employed.

Example 11 Powder for Insufflation

A powder mixture consisting of 100 mg. of (3-cyano-4,5-dimethyl-2-pyrryl)oxamic acid, sodium salt (Ia) and sufficient lactose to make 5 grams of mixture is micropulverized and placed in an insufflator designed to deliver 50 mg. of powder per dose.

The powder is inhaled into the lungs for prevention of asthmatic attacks.

Example 12 Aerosol

Twelve grams of an aerosol composition is prepared from the following ingredients:

|  | Gm. |
|---|---|
| (3-cyano-4,5-dimethyl-2-pyrryl)-oxamic acid, sodium salt (Ia) | 0.015 |
| 50% ethanol | 4.855 |
| Freon 12 | 1.43 |
| Freon 114 | 5.70 |

The oxamic acid, sodium salt (Ia) is dissolved in the 50% ethanol and chilled to −30° C. and added to the chilled Freons. The 12 grams of composition is added to a 13 cc. plastic coated bottle and capped with a metering valve. The metering valve releases 80 mg. of composition in an aerosol.

The aerosol is inhaled every 4 to 6 hours for prevention of asthmatic attacks.

Following the procedure of Example 12, but substituting an appropriate amount of the THAM salt of (3-cyano-4,5-dimethyl-2-pyrryl)oxamic acid (Ia), gives an aerosol that can be similarly employed.

The procedures described above in Examples 6 through 12 for the preparation of the compositions of (3-cyano-4,5-dimethyl-2-pyrryl)oxamic acid, sodium salt (Ia), can also be employed in the production of medicaments wherein the active ingredient is another compound embraced by Formula Ia, e.g., (3-cyano-4,5-diethyl-2-pyrryl)oxamic acid, sodium salt (Ia),
(3-cyano-4,5-dipropyl-2-pyrryl)oxamic acid, sodium salt (Ia),
(3-cyano-4,5-dibutyl-2-pyrryl)oxamic acid, sodium salt (Ia),
(3-cyano-4,5-dibutyl-2-pyrryl)oxamic acid, potassium salt (Ia),
(3-cyano-4,5-diisopropyl-2-pyrryl)-oxamic acid, sodium salt (Ia),
(3-cyano-4,5-dipentyl-2-pyrryl)oxamic acid, sodium salt (Ia),
(3-cyano-4,5-dihexyl-2-pyrryl)oxamic acid, ammonium salt (Ia),
(3-cyano-4,5-diisobutyl-2-pyrryl)oxamic acid, ammonium salt (Ia),
(3-cyano-4-phenylpyrrol-2-yl)oxamic acid, potassium salt (Ia),
[3-cyano-4-(p-bromo)phenylpyrrol-2-yl]oxamic acid, potassium salt (Ia),
[3-cyano-4-(p-chloro)phenylpyrrol-2-yl]oxamic acid, potassium salt (Ia),
[3-cyano-4-(p-fluoro)phenylpyrrole-2-yl]oxamic acid, potassium salt (Ia),
[3-cyano-4-(m-chloro)phenylpyrrol-2-yl]oxamic acid, calcium salt (Ia),
[3-cyano-4-(o-fluoro)phenylpyrrol-2-yl]oxamic acid, calcium salt (Ia),
[3-cyano-4-(o-methoxy)phenylpyrrol-2-yl]oxamic acid, calcium salt (Ia),
[3-cyano-4-(p-methoxy)phenylpyrrol-2-yl]oxamic acid, ammonium salt (Ia),
[3-cyano-4-(p-methoxy)-phenylpyrrol-2-yl]oxamic acid, sodium salt (Ia),
[3-cyano-4-(o-methyl)phenylpyrrol-2-yl]oxamic acid, sodium salt (Ia),
[3-cyano-4-(m-methyl)phenylpyrrol-2-yl]oxamic acid, sodium salt (Ia),
(3-cyano-5-methyl-4-phenylpyrrol-2-yl)oxamic acid, sodium salt (Ia),
[3-cyano-5-methyl-4-(o-chloro)-phenylpyrrol-2-yl]oxamic acid, ammonium salt (Ia),
[3-cyano-5-methyl-4-(p-fluoro)phenylpyrrol-2-yl]oxamic acid, sodium salt (Ia),
[3-cyano-5-methyl-4-(o-methoxy)phenylpyrrol-2-yl]oxamic acid, calcium salt (Ia),
[3-cyano-5-methyl-4-(m-methyl)phenylpyrrol-2-yl]oxamic acid, sodium salt (Ia),
[3-cyano-5-methyl-4-(p-methyl)phenylpyrrol-2-yl]oxamic acid, potassium salt (Ia),
[3-cyano-5-methyl-4-(o-ethyl)phenylpyrrol-2-yl]oxamic acid, calcium salt (Ia),
[3-cyano-5-methyl-4-(m-methyl)phenylpyrrol-2-yl]oxamic acid, ammonium salt (Ia),
(3-cyano-4,5-dimethylpyrrol-2-yl)oxamic acid, THAM salt (Ia),
(3-cyano-4,5-dipropylpyrrol-2-yl)oxamic acid THAM salt (Ia),
(3-cyano-4,5-diisobutylpyrrol-2-yl)-oxamic acid, THAM salt (Ia),
(3-cyano-4-phenylpyrrol-2-yl)-oxamic acid, THAM salt (Ia),
[3-cyano-4-(p-chloro)phenylpyrrol-2-yl]oxamic acid, THAM salt (Ia),
[3-cyano-4-(p-fluoro)phenylpyrrol-2-yl]oxamic acid, THAM salt (Ia),
[3-cyano-4-(o-methoxy)phenylpyrrol-2-yl]oxamic acid, THAM salt (Ia),
[3-cyano-4-(m-methyl)phenylpyrrol-2-yl]oxamic acid, THAM salt (Ia),
(3-cyano-5-methyl-4-phenylpyrrol-2-yl)-oxamic acid, THAM salt (Ia),
[3-cyano-5-methyl-4-(p-fluoro)-phenylpyrrol-2-yl]oxamic acid, THAM salt (Ia),
[3-cyano-5-methyl-4-(p-methyl)phenylpyrrol-2-yl]oxamic acid, THAM salt (Ia),
(3-cyano-4,5-dimethyl-1-phenylpyrrol-2-yl)oxamic acid (Ia),
(3-cyano-4,5-dimethyl-1-phenylpyrrol-2-yl)oxamic acid, sodium salt (Ia),
(3-cyano-4,5-dimethyl-1-phenylpyrrol-2-yl)oxamic acid, calcium salt (Ia),
(3-cyano-4-methyl-1-phenylpyrrol-2-yl)oxamic acid (Ia),
(3-cyano-4-methyl-5-ethyl-1-phenylpyrrol-2-yl)oxamic acid (Ia),
(3-cyano-4-methyl-5-propyl-1-phenylpyrrol-2-yl)oxamic acid, ammonium salt (Ia),
(3-cyano-4,5-dimethyl-1-methylpyrrol-2-yl)oxamic acid (Ia), (3-cyano-4,5-dimethyl-1-propylpyrrol-2-yl)oxamic acid, calcium salt (Ia),
(3-cyano-4,5-dimethyl-1-pentylpyrrol-2-yl)oxamic acid (Ia),
[3-cyano-4,5-dimethyl-1-(o-bromoanilino)pyrrol-2-yl]oxamic acid, THAM salt (Ia),
[3-cyano-4,5-dimethyl-1-(m-chloroanilino)pyrrol-2-yl]oxamic acid, THAM salt (Ia),
[3-cyano-4,5-dimethyl-1-(p-fluoroanilino)pyrrol-2-yl]oxamic acid, potassium salt (Ia),
[3-cyano-4,5-dimethyl-1-(o-methoxyanilino)pyrrol-2-yl]oxamic acid, THAM salt (Ia),
[3-cyano-4,5-dimethyl-1-(o-methoxyanilino)pyrrol-2-yl]oxamic acid, THAM salt (Ia),
[3-cyano-4,5-dimethyl-1-($\alpha,\alpha,\alpha$-trifluoro-o-toluidino)pyrrol-2-yl]oxamic acid, sodium salt (Ia),
[3-cyano-4-methyl-1-butylpyrrol-2-yl]oxamic acid, THAM salt (Ia),
[3-cyano-4-methyl-1-(o-bromoanilino)pyrrol-2-yl]oxamic acid, THAM salt (Ia),
[3-cyano-4-methyl-1-(m-methoxyanilino)pyrrol-2-yl]oxamic acid, THAM salt (Ia),
[3-cyano-4-methyl-1-(p-methylanilino)pyrrol-2-yl]oxamic acid, THAM salt (Ia),
[3-cyano-4-methyl-1-($\alpha,\alpha,\alpha$-trifluoro-p-toluidino)pyrrol-2-yl]oxamic acid, THAM salt (Ia),
(3-cyano-4-methyl-5-ethyl-1-propylpyrrol-2-yl]oxamic acid, THAM salt (Ia),
[3-cyano-4-methyl-5-ethyl-1-(o-chloroanilino)pyrrol-2-yl]oxamic acid, sodium salt (Ia),
[3-cyano-4-methyl-5-ethyl-1-(m-methoxyanilino)pyrrol-2-yl]oxamic acid, THAM salt (Ia),
[3-cyano-4-methyl-5-ethyl-1-(p-methylanilino)pyrrol-2-yl]oxamic acid, THAM salt (Ia),
(3-cyano-4-methyl-5-propyl-1-ethylpyrrol-2-yl)oxamic acid, THAM salt (Ia),
[3-cyano-4-methyl-5-propyl-1-(o-fluoroanilino)pyrrol-2-yl]oxamic acid, THAM salt (Ia),
[3-cyano-4-methyl-5-propyl-1-(m-methoxyanilino)pyrrol-2-yl]oxamic acid, ammonium salt (Ia),
[3-cyano-4-methyl-5-propyl-1-(p-methylanilino)pyrrol-2-yl]oxamic acid, THAM salt (Ia),
[3-cyano-4-methyl-5-propyl-1-($\alpha,\alpha,\alpha$-trifluoro-m-toluidino)pyrrol-2-yl]oxamic acid, THAM salt (Ia), etc.

While the treatment of hay fever, bronchial asthma, food allergy, allergic rhinitis and asthmatic attacks disclosed following Examples 6 through 12 utilizes (3-cyano-4,5-dimethyl-2-pyrryl)oxamic acid, sodium salt (Ia), similarly effective therapy is provided with comparable dosages by employing medicaments wherein the active ingredient is another compound embraced by Formula Ia, e.g., (3-cyano-4,5-diethyl-2-pyrryl)oxamic acid, sodium salt (Ia),
(3-cyano-4,5-dipropyl-2-pyrryl)oxamic acid, sodium salt (Ia),
(3-cyano-4,5-dimethyl-2-pyrryl)oxamic acid, sodium salt (Ia),
(3-cyano-4,5-dipentyl-2-pyrryl)oxamic acid sodium salt (Ia),
(3-cyano-4,5-diisopropyl-2-pyrryl)oxamic acid, sodium salt (Ia),
(3-cyano-4,5-dibutyl-2-pyrryl)oxamic acid, THAM salt (Ia),
(3-cyano-4-phenylpyrrol-2-yl)oxamic acid, ammonium salt (Ia),
[3-cyano-4-(o-chloro)phenylpyrrol-2-yl]oxamic acid, ammonium salt (Ia),
[3-cyano-4-(m-fluoro)phenylpyrrol-2-yl]oxamic acid, potassium salt (Ia),
[3-cyano-4-(p-bromo)-phenylpyrrol-2-yl]oxamic acid, potassium salt (Ia),
[3-cyano-4-(o-methoxy)phenylpyrrol-2-yl]oxamic acid, calcium salt (Ia),
[3-cyano-4-(m-ethoxy)phenylpyrrol-2-yl]oxamic acid, calcium salt (Ia),
[3-cyano-4-(p-methyl)phenylpyrrol-2-yl]oxamic acid, ammonium salt (Ia),
[3-cyano-4-(o-methyl)-phenylpyrrol-2-yl]oxamic acid, sodium salt (Ia),
(3-cyano-5-methyl-4-phenylpyrrol-2-yl)oxamic acid, potassium salt (Ia),
(3-cyano-5-methyl-4-phenylpyrrol-2-yl)oxamic acid, calcium salt (Ia),
[3-cyano-5-methyl-4-(o-bromo)phenylpyrrol-2-yl]oxamic acid, calcium salt (Ia),
[3-cyano-5-methyl-4-(m-chloro)phenylpyrrol-2-yl]oxamic acid, calcium salt (Ia),
[3-cyano-5-methyl-4-(o-methoxy)phenylpyrrol-2-yl]oxamic acid, ammonium salt (Ia),
[3-cyano-5-methyl-4-(m-methoxy)phenylpyrrol-2-yl]oxamic acid, ammonium salt (Ia),
[3-cyano-5-methyl-4-(p-methyl)phenylpyrrol-2-yl]oxamic acid, sodium salt (Ia),
[3-cyano-5-methyl-4-(o-methyl)phenylpyrrol-2-yl]oxamic acid, sodium salt (Ia),
(3-cyano-4-ethyl-2-pyrryl)oxamic acid, potassium salt (Ia),
(3-cyano-4-methyl-2-pyrryl)oxamic acid, potassium salt (Ia),
(3-cyano-4,5-diethylpyrrol-2-yl)oxamic acid, THAM salt (Ia),
(3-cyano-4,5-dipropylpyrrol-2-yl)oxamic acid, THAM salt (Ia),
(3-cyano-4,5-dipentylpyrrol-2-yl)oxamic acid, THAM salt (Ia),
(3-cyano-4-phenylpyrrol-2-yl)oxamic acid, THAM salt (Ia),
[3-cyano-4(o-fluoro)phenylpyrrol-2-yl]oxamic acid, THAM salt (Ia),
[3-cyano-4-(m-methoxy)phenylpyrrol-2-yl]oxamic acid, THAM salt (Ia),
[3-cyano-4-(p-methyl)phenylpyrrol-2-yl]oxamic acid, THAM salt (Ia),
(3-cyano-5-methyl-4-phenyl-pyrrol-2-yl)oxamic acid, THAM salt (Ia),
[3-cyano-5-methyl-4-(o-fluoro)phenylpyrrol-2-yl]oxamic acid, THAM salt (Ia),
[3-cyano-5-methyl-4-(m-methoxy)phenylpyrrol-2-yl]oxamic acid, THAM salt (Ia),
[3-cyano-5-methyl-4-(p-methyl)phenylpyrrol-2-yl]oxamic acid, THAM salt (Ia),
(3-cyano-4-methyl-2-pyrrol)oxamic acid, THAM salt (Ia),
(3-cyano-4,5-dimethyl-1-phenylpyrrol-2-yl)oxamic acid, THAM salt (Ia),
(3-cyano-4,5-dimethyl-1-phenylpyrrol-2-yl)oxamic acid, potassium salt (Ia),
(3-cyano-4-methyl-1-phenylpyrrol-2-yl)oxamic acid, THAM salt (Ia),
(3-cyano-4-methyl-5-ethyl-1-phenylpyrrol-2-yl)oxamic acid, THAM salt (Ia),
(3-cyano-4-methyl-5-ethyl-1-phenylpyrrol-2-yl)oxamic acid, sodium salt (Ia),
(3-cyano-4-methyl-5-propyl-1-phenylpyrrol-2-yl)oxamic acid, THAM salt (Ia),
(3-cyano-4,5-dimethyl-1-ethylpyrrol-2-yl)oxamic acid, THAM salt (Ia),
(3-cyano-4,5-dimethyl-1-propylpyrrol-2-yl)oxamic acid, ammonium salt (Ia),
(3-cyano-4,5-dimethyl-1-hexylpyrrol-2-yl)oxamic acid, THAM salt (Ia),
[3-cyano-4,5-dimethyl-1-(o-chloroanilino)pyrrol-2-yl]oxamic acid, THAM salt (Ia),
[3-cyano-4,5-dimethyl-1-(m-methoxyanilino)pyrrol-2-yl]oxamic acid, THAM salt (Ia),

[3-cyano-4,5-dimethyl-1-(p-methylanilino)pyrrol-2-yl]
oxamic acid, THAM salt (Ia),
[3-cyano-4,5-dimethyl-1-($\alpha,\alpha,\alpha$-trifluoro-m-toluidino)
pyrrol-2-yl]oxamic acid, THAM salt (Ia),
(3-cyano-4-methyl-1-propylpyrrol-2-yl)oxamic acid,
THAM salt (Ia),
[3-cyano-4-methyl-1-(m-chloroanilino)pyrrol-2-yl]
oxamic acid, THAM salt (Ia),
[3-cyano-4-methyl-1-(o-methoxyanilino)pyrrol-2-yl]
oxamic acid, THAM salt (Ia),
[3-cyano-4-methyl-1-(p-methylanilino)pyrrol-2-yl]
oxamic acid, THAM salt (Ia),
[3-cyano-4-methyl-1-($\alpha,\alpha,\alpha$-trifluoro-o-toluidino)pyrrol-2-
yl]oxamic acid, sodium salt (Ia),
(3-cyano-4-methyl-5-ethyl-1-pentylpyrrol-2-yl)oxamic
acid, THAM salt (Ia),
(3-cyano-4-methyl-5-ethylpyrrol-2-yl]oxamic acid, THAM
salt (Ia),
[3-cyano-4-methyl-5-ethyl-1-(m-chloroanilino)pyrrol-2-
yl]oxamic acid, THAM salt (Ia),
[3-cyano-4-methyl-5-ethyl-1-(p-fluoroanilino)pyrrol-2-yl]
oxamic acid, calcium salt (Ia),
[3-cyano-4-methyl-5-ethyl-1-(o-methoxyanilino)pyrrol-2-
yl]oxamic acid, THAM salt (Ia),
[3-cyano-4-methyl-5-ethyl-1-(m-methylanilino)pyrrol-2-
yl]oxamic acid, THAM salt (Ia),
(3-cyano-4-methyl-5-propyl-1-propylpyrrol-2-yl)oxamic
acid, THAM salt (Ia),
[3-cyano-4-methyl-5-propyl-1-(o-bromoanilino)pyrrol-2-
yl]oxamic acid, THAM salt (Ia),
[3-cyano-4-methyl-5-propyl-1-(p-methoxyanilino)pyrrol-
2-yl]oxamic acid, sodium salt (Ia),
[3-cyano-4-methyl-5-propyl-1-(m-methylanilino)pyrrol-2-
yl]oxamic acid, THAM salt (Ia),
[3-cyano-4-methyl-5-propyl-1-($\alpha,\alpha,\alpha$-trifluoro-p-tolui-
dino)pyrrol-2-yl]oxamic acid, THAM salt (Ia),
etc.

What is claimed is:
1. A compound of the formula

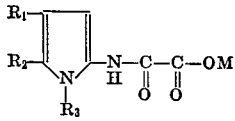

wherein M is selected from the group consisting of hydrogen, aluminum, ammonium, sodium, potassium, calcium, and tris(hydroxymethyl)methyl ammonium, $R_1$ is selected from the group consisting of lower alkyl of 1 through 6 carbon atoms,

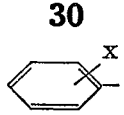

wherein X is selected from the group consisting of hydrogen, fluorine, chlorine, bromine, methoxy, methyl, and trifluoromethyl, $R_2$ is selected from the group consisting of hydrogen and lower alkyl of 1 through 6 carbon atoms, and $R_3$ has the same meaning as $R_1$ and in addition hydrogen.

2. A compound of claim 1 wherein M is sodium, $R_1$ and $R_2$ are methyl, and $R_3$ is hydrogen, namely, (3-cyano-4,5-dimethylpyrrol-2-yl)oxamic acid, sodium salt.

3. A compound of claim 1 wherein M is hydrogen, $R_1$ is

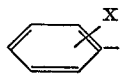

wherein X is hydrogen and $R_2$ and $R_3$ are hydrogen, namely, (3-cyano-4-phenylpyrrol-2-yl)oxamic acid.

4. A compound of claim 1 wherein M is hydrogen, $R_1$ is

wherein X is hydrogen, $R_2$ is methyl, and $R_3$ is hydrogen, namely, (3-cyano-5-methyl-4-phenylpyrrol-2-yl)oxamic acid.

5. A compound of claim 1 wherein M is hydrogen, $R_1$ and $R_2$ are methyl and $R_3$ is

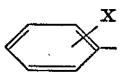

wherein X is hydrogen, namely, (3-cyano-4,5-dimethyl-1-phenylpyrrol-2-yl)oxamic acid.

References Cited

Theilheimer, "Synthetic Methods of Organic Chemistry," vol. 16 (1962), p. 235, #502.

JOSEPH A. NARCAVAGE, Primary Examiner

U.S. Cl. X.R.

260—326.62; 424—274

UNITED STATES PATENT OFFICE
CERTIFICATE OF CORRECTION

Patent No. 3,836,541                    Dated September 17, 1974

Inventor(s) Herbert G. Johnson, John B. Wright, Charles M. Hall, and Donald T. Warner It is certified that error appears in the above-identified patent and that said Letters Patent are hereby corrected as shown below:

Column 2, line 3, " alky" " should read --alkyl"--; Column 3, line 6, "$N_1$-" should read --$N^1$- --; line 45, "of 2-amino-" should read --of a 2-amino- --; Column 4, line 15, "$\overset{O}{\underset{\|}{\phantom{x}}}\overset{O}{\underset{\|}{\phantom{x}}}$" should read "X'$\overset{O}{\underset{\|}{C}}$-$\overset{O}{\underset{\|}{C}}$OR" --X'CCOR--; Column 7, line 1, "-cyano-.4-" should read -- -cyano-4- --; lines 1-2, "phenylpyrole" should read --phenylpyrrole--; lines 14-15, "material)," should read --material,--; Column 9, line 4, "3-amino-" should read -- 2-amino- --; line 9, "(p-ethyl)" should read --(p-methyl)--; line 13, "Bully." should read --Bull.--; Column 10, line 70, "3--" should read -- 3- --; Column 11, line 57, "yl[" should read --yl]--; line 61, "yl[" should read --yl]--; line 63, "yl[" should read --yl]--; line 69, "yl[" should read --yl]--; Column 12, line 1, "-5-" should read -- -4-- ; line 2, "yl[" should read --yl]--; line 6, "yl[" should read --yl]--; line 33, "2-cyano-" should read -- (3-cyano- --; line 39, "and and 20 of" should read --and 20 ml. of--; line 56, "pyrryl oxamate" should read --pyrryl)oxamate--; Column 13, line 45, "4,5 diethyl" should read --4,5-diethyl--; Column 18, line 68, "[prepared" should read --(prepared--; line 69, "836]" should read --836)--; line 70, "[prepared" should read --(prepared--; line 71, "6824]" should read --6824)--; line 74, "[prepared" should read --(prepared--; line 75, "2544]" should read --2544)--; Column 19, line 1, "[prepared" should read --(prepared--; line 1, "3599]" should read --3599)--; line 2, "[prepared" should read --(prepared--; line 3, "494]" should read --494)--; line 4, "[prepared" should read --(prepared--; line 5, "955]" should read --955)--; line 6, "[prepared" should read --(prepared--; line 7, "233]" should read --233)--; line 8, "[prepared" should read --(prepared--; line 9, "1013]" should read --1013)--; line 12, "[prepared" should read --(prepared--; line 13, "2469]" should read --2469)--; Column 20, line 5, "-2- ]" should read --2-yl]--; line 40, "fluoraniline" should read -- fluroraniline --  ;

UNITED STATES PATENT OFFICE
CERTIFICATE OF CORRECTION

Patent No. 3,836,541      Dated September 17, 1974

Inventor(s) Herbert G. Johnson, John B. Wright, Charles M. Hall, and Donald T. Warner It is certified that error appears in the above-identified patent and that said Letters Patent are hereby corrected as shown below:

Column 22, line 24, "sweeteners" should read --sweetners--; line 65, "aluminium" should read --aluminum--; line 72, "M-aluminum" should read --M=aluminum--; line 72, "sodium" should read --sodium,--; Column 23, line 9, "as" should read --at--; line 46, "0.1" should read --0.01--; line 66, "for" should read --or--; line 75, "condiitons" should read --conditions--; Column 27, line 17, "[3-" should read --(3- --; line 17, "yl]" should read --yl)--; Column 29, lines 41-45, formula Ia,

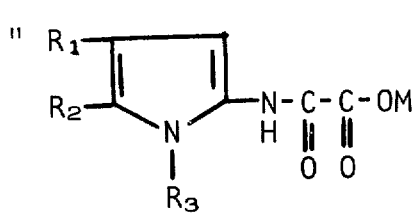 should read -- 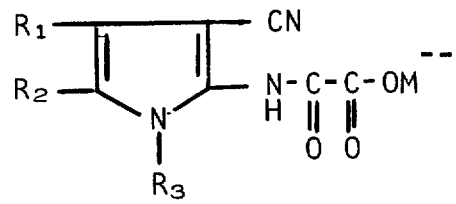 --

Signed and Sealed this

Seventeenth Day of April 1979

[SEAL]

Attest:

RUTH C. MASON  
Attesting Officer

DONALD W. BANNER  
Commissioner of Patents and Trademarks